(12) United States Patent
Nomura

(10) Patent No.: US 8,799,524 B2
(45) Date of Patent: Aug. 5, 2014

(54) INFORMATION PROCESSING APPARATUS, DRIVER SETTING METHOD, AND STORAGE MEDIUM

(75) Inventor: Yukie Nomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 12/570,813

(22) Filed: Sep. 30, 2009

(65) Prior Publication Data

US 2010/0085599 A1 Apr. 8, 2010

(30) Foreign Application Priority Data

Oct. 6, 2008 (JP) ................................ 2008-259717

(51) Int. Cl.
*G06F 3/00* (2006.01)
*G06F 9/445* (2006.01)
*G06F 9/44* (2006.01)
*G06F 9/46* (2006.01)
*G06F 13/00* (2006.01)
*G06F 9/00* (2006.01)
*G06F 9/24* (2006.01)
*G06F 15/177* (2006.01)
*G06F 1/24* (2006.01)

(52) U.S. Cl.
USPC ................ 710/8; 710/10; 717/177; 719/327; 713/1; 713/100

(58) Field of Classification Search
USPC ............ 710/8, 10; 717/177; 719/327; 713/1, 713/100
See application file for complete search history.

(56) References Cited

U.S. PATENT DOCUMENTS

| 5,692,111 | A * | 11/1997 | Marbry et al. ............... 358/1.15 |
| 6,282,711 | B1 * | 8/2001 | Halpern et al. ............... 717/175 |
| 6,424,424 | B1 * | 7/2002 | Lomas et al. ................ 358/1.14 |
| 7,107,330 | B1 * | 9/2006 | Hamilton et al. ............ 709/221 |
| 7,743,374 | B2 * | 6/2010 | Machida ....................... 717/176 |
| 7,853,946 | B2 * | 12/2010 | Minagawa .................... 717/178 |
| 2003/0131150 | A1 * | 7/2003 | Sugiura ......................... 709/321 |
| 2006/0221372 | A1 * | 10/2006 | Onishi et al. ................. 358/1.13 |
| 2006/0221380 | A1 * | 10/2006 | Pretz et al. ................... 358/1.15 |
| 2006/0224780 | A1 * | 10/2006 | Saito .................................. 710/8 |
| 2008/0137136 | A1 * | 6/2008 | Shin ............................. 358/1.15 |
| 2008/0201726 | A1 * | 8/2008 | Nagashima ................... 719/327 |

FOREIGN PATENT DOCUMENTS

| JP | 2004-038296 | 2/2004 |
| JP | 2006-011950 | 1/2006 |

* cited by examiner

*Primary Examiner* — Henry Tsai
*Assistant Examiner* — Eric Oberly
(74) *Attorney, Agent, or Firm* — Fitzpatrick, Cella, Harper & Scinto

(57) ABSTRACT

An information processing apparatus capable of reducing the labor of a user to create at least one definition file for use in installing drivers on respective ones of a plurality of devices. A server connected to printers accepts input/edition of print information necessary to install printer drivers selected by the user on printers, and accepts selection of printers on which printer drivers applied with the input/edited print information are installed. Methods for creating at least one definition file necessary to install the drivers on the selected printers are presented for selection, and at least one execution file is created in accordance with the selected creation method.

7 Claims, 21 Drawing Sheets

FIG.21

2102 — [Driver]
PrinterDriverVerInst = LIPS 4 Printer Driver Version 12.20
PrinterDriverVerDrv = 06/26/2007,2.10.0.0
PrinterDriverInstaller = ..¥InstallerSet¥Setup.exe — 2101
SrcInstPath = C:¥Documents and Settings ¥PC¥Desktop¥V12.20¥

2103 — [Printers]
PRINTER 1 =
PRINTER 2 =           } DETAILS ARE STORED IN MEMORY B
PRINTER 3 =

2104 — [PRINTER 1]
PrinterName = PRINTER 1
DriverName = ○ × △ LPX3410 LIPS
Protcol = 2
QueName = IP
PortName = 192.168.10.13@IP
IPAddr = 192.168.10.13             } DETAILS ARE STORED IN MEMORY A
PortNo = 515
LPR = 0
SNMP = 0
SNMPComName =
SNMPDevIndex = 0
Place =
Comment =
DefaultPrinter = 1

[PRINTER 2]
:
:
:

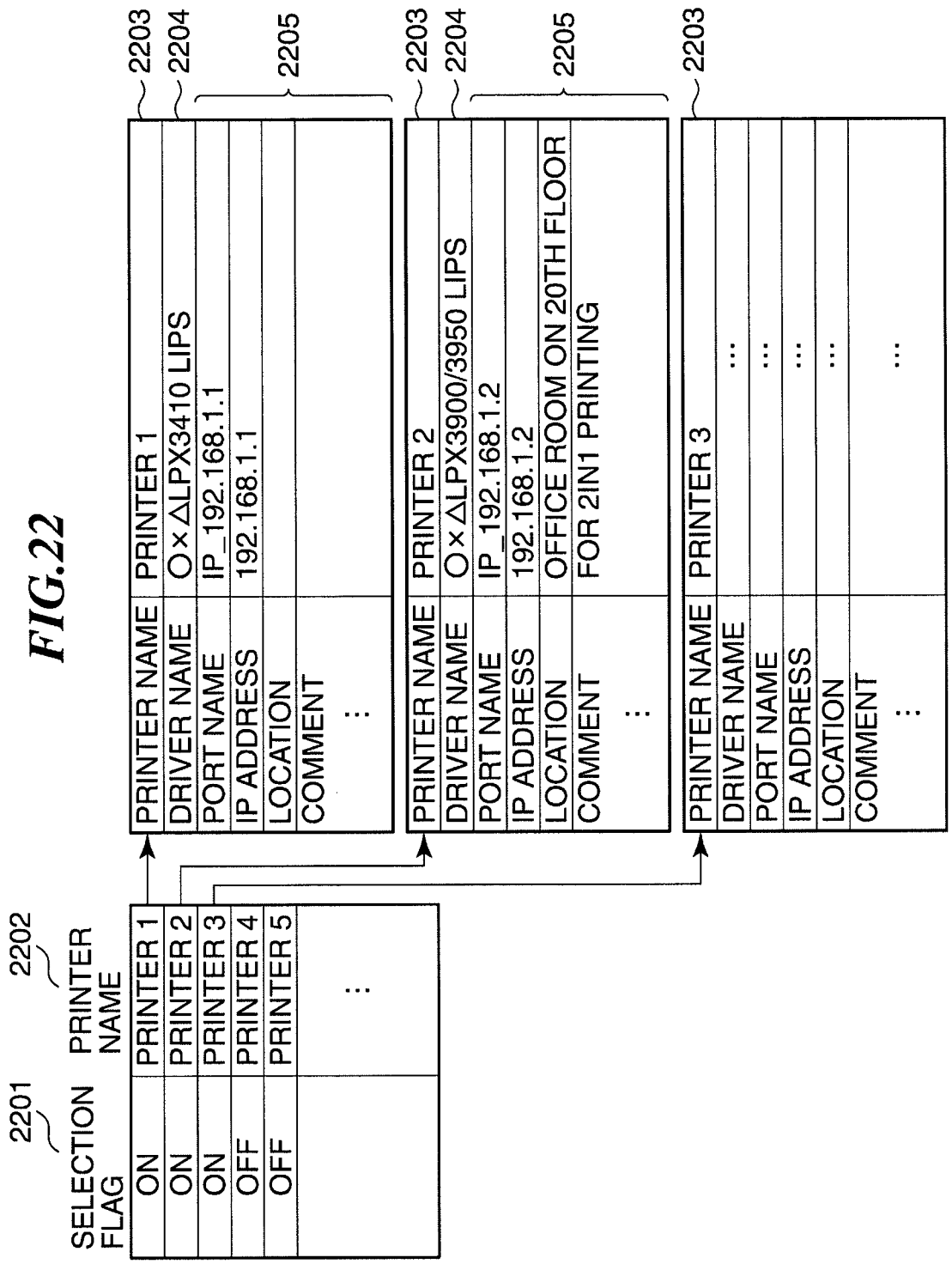

INFORMATION PROCESSING APPARATUS, DRIVER SETTING METHOD, AND STORAGE MEDIUM

BACKGROUND OF THE INVENTION

1. Field of the Invention

The present invention relates to a technique for creation of definition files for use by device drivers.

2. Description of the Related Art

Conventionally, there has been a printing system having printers installed on a network and shared by client terminals. Sometimes in such a printing system, printer driver setting at printer driver installation on a client terminal is left to a user who utilizes the client terminal, which makes it difficult to manage printer drivers. To obviate this, the administrator explains in document the users about printer driver setting on client terminals, or performs himself/herself the printer driver setting on each individual printer.

However, the increase in the number of client terminals and setting work at a remote place increase the administrator's labor, which poses problems. To reduce the labor, there has been disclosed a technique for changing a default printer setting or adding a printer object to a printer by using a definition file created beforehand by the administrator and a printer replication setting tool (see, e.g., Japanese Laid-open Patent Publication No. 2004-38296). The definition file is able to identify a printer name, printer driver name, connection destination information for use when printer is used, and information of locations of printer driver and printer driver install program. By using a printer driver found by search based on the definition file, an installation process is executed.

Japanese Laid-open Patent Publication No. 2004-38296 also discloses a technique for replicating a printer object and changing the prescribed setting of the replicated printer object based on a setting file, which is created beforehand and able to identify a printer driver name, etc. The setting file is an INF file comprised of section names, item names, and values.

With the technique proposed in Japanese Laid-open Patent Publication No. 2004-38296, however, a user (e.g., administrator) who creates the definition file is required to set, on a screen, shared information and individual printer information. The shared information includes, e.g., an installer set storage path, application setting for use on the client side, log file storage path, user switching information, and other software start-up file storage path. The individual printer information includes, e.g., a printer name, driver name, port-related items, and comments.

With the technique proposed in Japanese Laid-open Patent Publication No. 2004-38296, the same shared information must be input at creation of each of definition files for different printers.

Although there is a function for editing an already created setting file, it is necessary to read the definition file, e.g., one hundred times for editing it to create one hundred definition files one by one for one hundred printers, which is extremely troublesome.

SUMMARY OF THE INVENTION

The present invention provides an information processing apparatus and a device driver setting method that enable a user to easily create definition files used fox installing device drivers on respective ones of a plurality of devices to thereby reduce the labor for device driver installation, and provides a storage medium storing a program for executing the device driver setting method.

According to a first aspect of this invention, there is provided an information processing apparatus for managing a plurality of devices, comprising a driver selection unit configured to accept selection of device drivers, a setting information input unit configured to accept input of setting information necessary for installing the selected device drivers on the plurality of devices, a device selection unit configured to accept selection of devices on which device drivers applied with the input setting information are to be installed, a creation method selection unit configured to cause selection of a creation method of install information necessary for installing the device drivers on the selected devices, and an execution file creation unit configured to create at least one execution file for installing the device drivers on the selected devices in accordance with the selected creation method.

According to a second aspect of this invention, there is provided a method relating to setting of device drivers for a plurality of devices, comprising the steps of accepting selection of device drivers, accepting input of setting information necessary for installing the selected device drivers on the plurality of devices, accepting selection of devices on which device drivers applied with the input setting information are to be installed, causing selection of a creation method of install information necessary for installing the device drivers on the selected devices, and creating at least one execution file for installing the device drivers on the selected devices in accordance with the selected creation method.

According to a third aspect of this invention, there is provided a storage medium storing a program for executing, the method of the second aspect of this invention.

Further features of the present invention will become apparent from the following description of an exemplary embodiment with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 21 is a view showing an example of definition file;

FIG. 22 is a view showing the format of information stored in a memory A set in a RAM or a memory.

DESCRIPTION OF THE EMBODIMENT

In the following, one embodiment of this invention will be described in detail with reference to the appended drawings.

Figure 1:
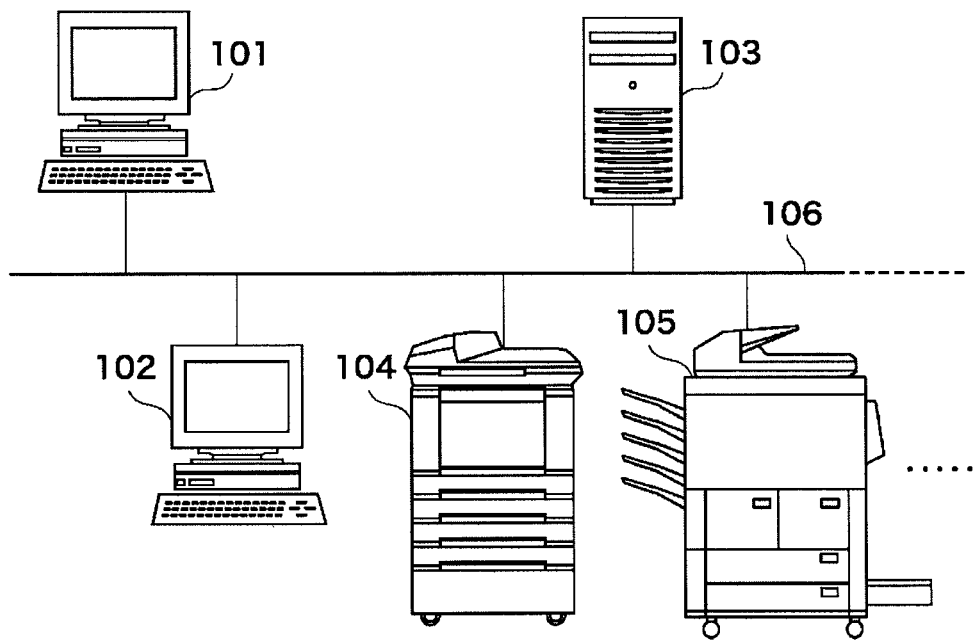
FIG. 1 is a view schematically showing the construction of a printing system according to one embodiment of this invention.

FIG. 1 schematically shows the construction of a printing system according to the embodiment of this invention.

Referring to FIG. 1, the printing system includes client terminals 101, 102, a server 103, and printers 104, 105, which are connected for communication with one another via a network 106, e.g., a LAN. The client terminals 101, 102 and the server 103 are each constituted by an information processing apparatus, e.g., a computer. Each of the printers 104, 105 may be implemented by an apparatus only having a printing function or by a multi-function peripheral having plural functions of printing, scanning, FAX transmission/reception, etc. It should be noted that apparatuses (devices) constituting the printing system are not limited to the types described above and shown in the illustrated examples. Also, the number of apparatuses is not limitative.

Figure 2:
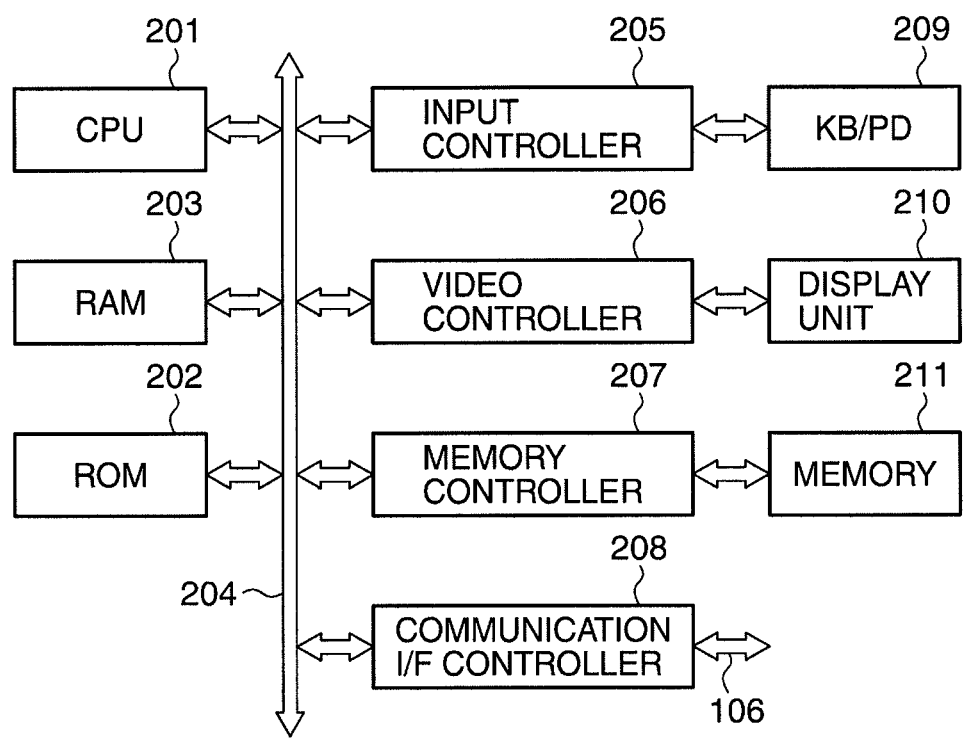
FIG. 2 is a block diagram showing an example of basic hardware construction of each of client terminals and a server shown in FIG. 1.

FIG. 2 shows in block diagram an example hardware construction of each of the client terminals 101, 102 and the server 103.

Referring to FIG. 2, the CPU 201 overall controls a ROM 202, RAM 203, memory 211 and various controllers (described later), which are connected to a system bus 204. The memory 211 is implemented by, e.g., a hard disk (HD), a floppy (registered trademark) disk (FD), or a compact flash (registered trademark) memory connected via an adapter to a PCMCIA card slot.

The RAM 203 functions as, e.g., a main memory and a work area for the CPU 201. The ROM 202 or the memory 211 stores a BIOS (basic input/output system) and an OS (operating system), which are control programs for the CPU 201, and programs, etc. required to realize the function of the server 103 or the client terminal 101 or 102, such as a boot program, browser software, applications, font data, user file, edit file, various data.

Programs for executing processes (described later) are stored in the memory 211, and loaded into the RAM 203 as required and executed by the CPU 201. Various data and tables for use by the CPU 201 to execute the processes are also stored in the memory 211.

An input controller 205 controls input from an operation input unit (KB/PD) 209, which is comprised of a keyboard (KB) and a pointing device (PD) such as a mouse. A video controller 206 controls display on a display unit 210, which is implemented by a CRT or liquid crystal display. The CPU 201 enables display on the display unit 210 by, e.g., developing (rasterizing) an outline font on a display information region of the RAM 203, and is able to accept user's (administrator's) input via a mouse cursor, not shown, on the display unit 210.

A memory controller 207 controls access to the memory 211. A communication I/F controller 208 controls connection and communication with an external unit such as the printer 104 via the network 106, and is able to perform, e.g., internet communication by using TCP/IP, for example.

Figure 3:
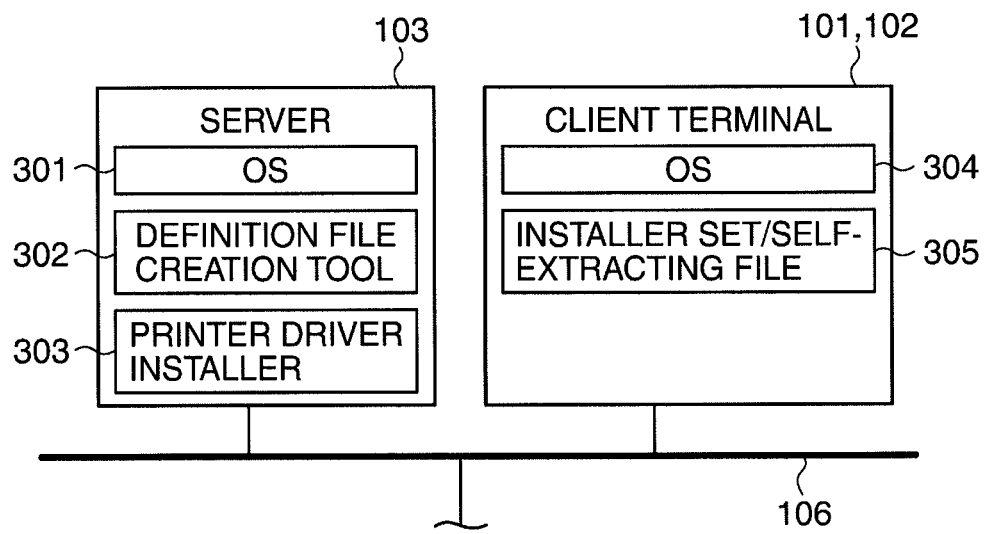
FIG. 3 is a block diagram schematically showing module constructions of the client terminals and the server.

FIG. 3 schematically shows in block diagram module constructions of the client terminals 101, 102 and the server 103.

As shown in FIG. 3, the server 103 has an OS 301, a definition file creation tool 302, and a printer driver installer (device driver installer) 303 as functional constituents related to this invention. The client terminals 101, 102 each have an OS 304 and an installer set/self-extracting file 305 as functional constituents related to this invention.

The OS 301 running on the server 103 is, e.g., a Microsoft Windows (registered trademark) operating system. The definition file creation tool 302 is a software module that executes a process shown in FIG. 5 (described later), thereby creating at least one definition file (install information) and the installer set/self-extracting file 305. The installer set/self-extracting file 305 is transmitted from the server 103 to the client terminals 101, 102.

The definition file used for printer driver installation is a file, such as shown in FIG. 21, to which values to be set at printer driver installation are output. These values to be set at printer driver installation (e.g., values to be managed by the operating system so as to correspond to printer objects (printer icons) displayed on a printer management screen), i.e., setting information, include printer names, host names or IP addresses, port names, protocols, LPR settings, locations, comments, folder names, default printers, etc. Printer names, host names or IP addresses, port names, protocols, LPR settings, locations, and comments can be set on a display screen of the display unit 210 shown in FIG. 12 described later. Folder names, default printers, etc. can be set on a display screen of the display unit 210 shown in FIG. 15 described later.

Figure 19:
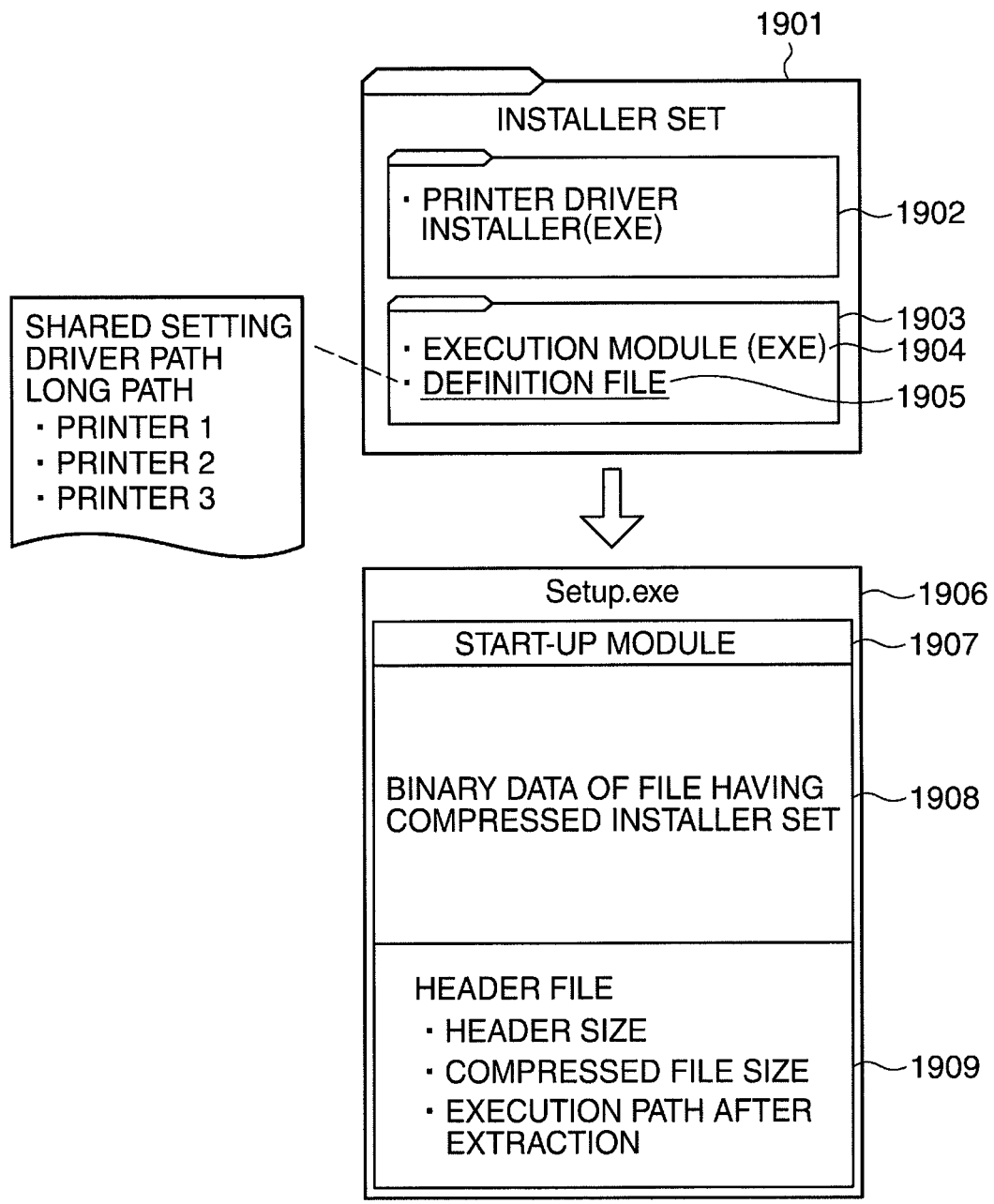
FIG. 19 is a view schematically showing the constructions of an installer set and a self-extracting file.

The installer set is comprised of the printer driver installer 303, execution module, and definition file (see, FIG. 19). The self-extracting file is a file created by compressing a plurality of files into one execution file (setup.exe) of an ordinary file format having a function of being automatically extracted when executed and activating an execution file designated beforehand.

The printer driver installer 303 is a software module for installing a printer driver on, e.g., the client terminal 101. The printer driver is incorporated in the printer driver installer 303. The printer driver is installed on, e.g., the client terminal 101 when the printer driver installer 303 is executed. The printer driver installer 303 is also used by the definition file creation tool 302 to create the installer set/self-extracting file 305.

The printer driver is a device driver for controlling a printer having an INF file (driver information) and a printer driver module. The INF file is, a setting file necessary to install a printer driver on, e.g., the client terminal 101, and describes which driver uses which file and where files are to be stored. The INF file is described in an INI file format.

The OS 304 running on the client terminals 101, 102 is, e.g., a Microsoft Windows (registered trademark) operating system. The installer set/self-extracting file 305 is a self-extracting file for installing desired printer drivers on the client terminals 101, 102 with the settings desired by the administrator. The installer set/self-extracting file 305 is created by the server 103, is transmitted to the client terminals 101, 102, and is stored into the RAM 203 or the memory 211.

Figure 4:
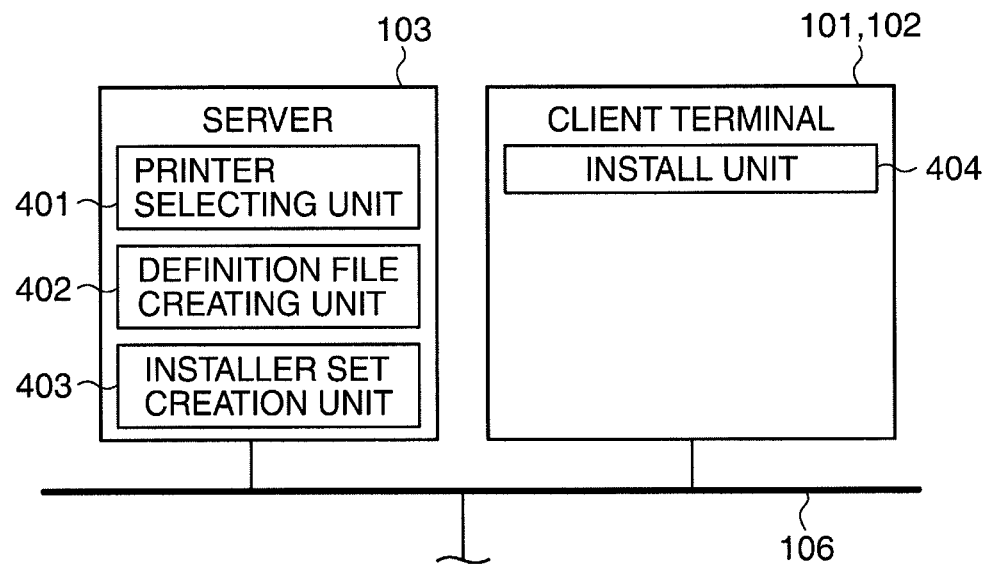
FIG. 4 is a block diagram schematically showing the functional constructions of the client terminals and the server.

FIG. 4 schematically shows the functional constructions of the client terminals 101, 102 and the server 103 in block diagram.

As shown in FIG. 4, the server 103 has a printer selecting unit 401, a definition file creating unit 402, and an installer set creation unit 403, as functional constituents related to this invention. The client terminals 101, 102 each have an install unit 404 as a functional constituent related to this invention.

The printer selecting unit 401 has functions of acquiring a driver group (written in INF file of printer driver) based on a designated printer driver installer 303, selecting from the driver group a driver to be installed, and designating values to be set for the driver.

The definition file creating unit 402 has a function of outputting, as a definition file as shown in FIG. 21, values to be set for the printer driver installer 303 selected by the printer selecting unit 401.

The installer set creation unit 403 has a function of storing the printer driver installer and the definition file created by the definition file creating unit 402 into a designated location and then creating the installer set/self-extracting file 305 from the printer driver installer and the definition file.

The install unit 404 has a function of extracting the installer set/self-extracting file received by the client terminal from the server, and then activating an execution file to install a printer driver on a selected printer with values designated by the printer selecting unit 401. Specifically, the printer driver stored in the printer driver installer is installed with the values designated by the printer selecting unit 401. It should be noted that the installation, which is to install at least a printer driver on the operating system by using a definition file, includes setting of values for a print system provided by the operating system.

Next, with reference to FIGS. 10 to 18, a description will be given of screens which are displayed on the display unit 210 in the processes shown in FIGS. 5 to 9 (described later). It should be noted that the illustrated screens are examples and not limitative.

Figure 10:
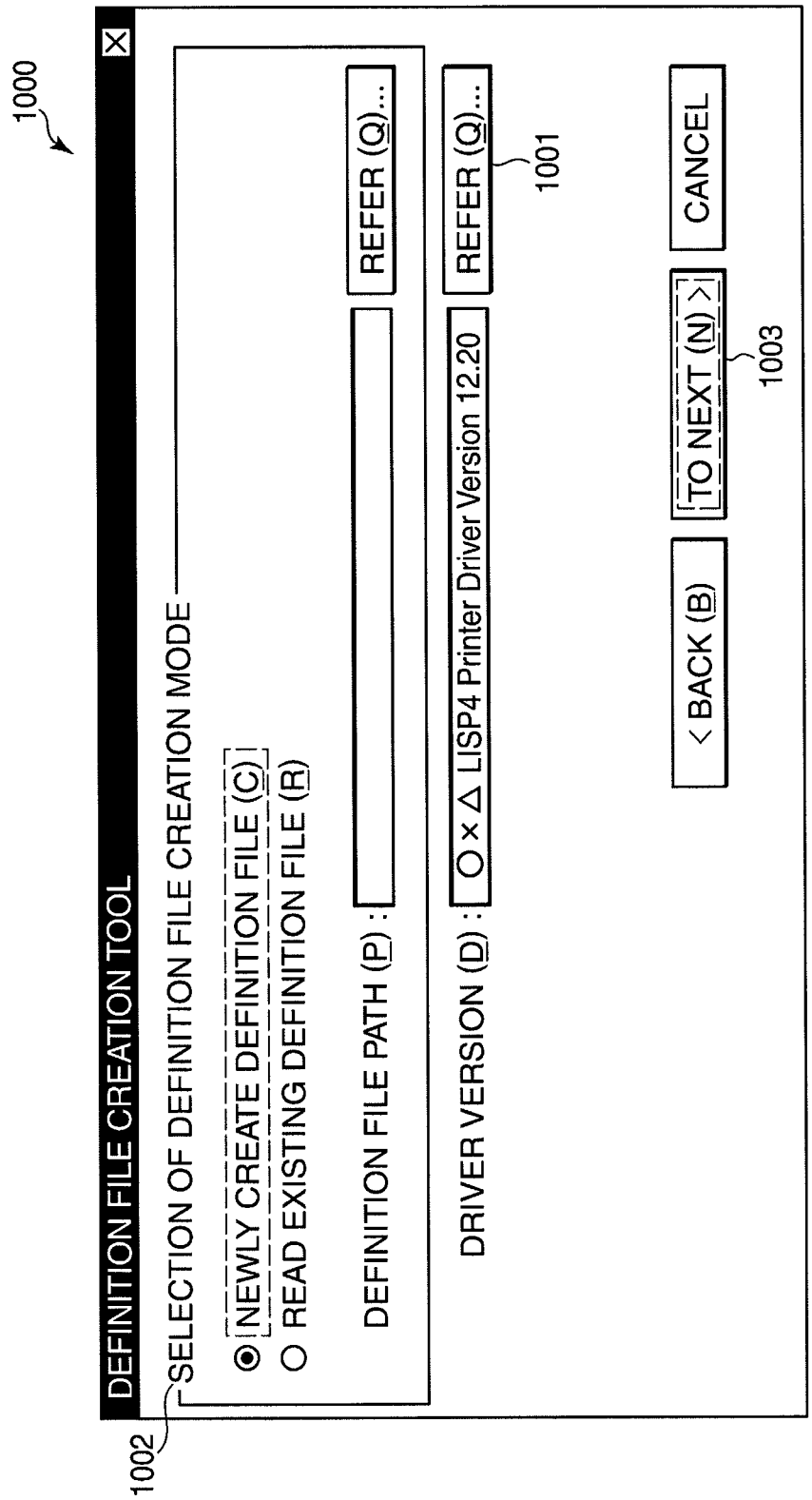
FIG. 10 is a view showing an example of definition-file creation mode screen displayed on a display unit.
Figure 11:
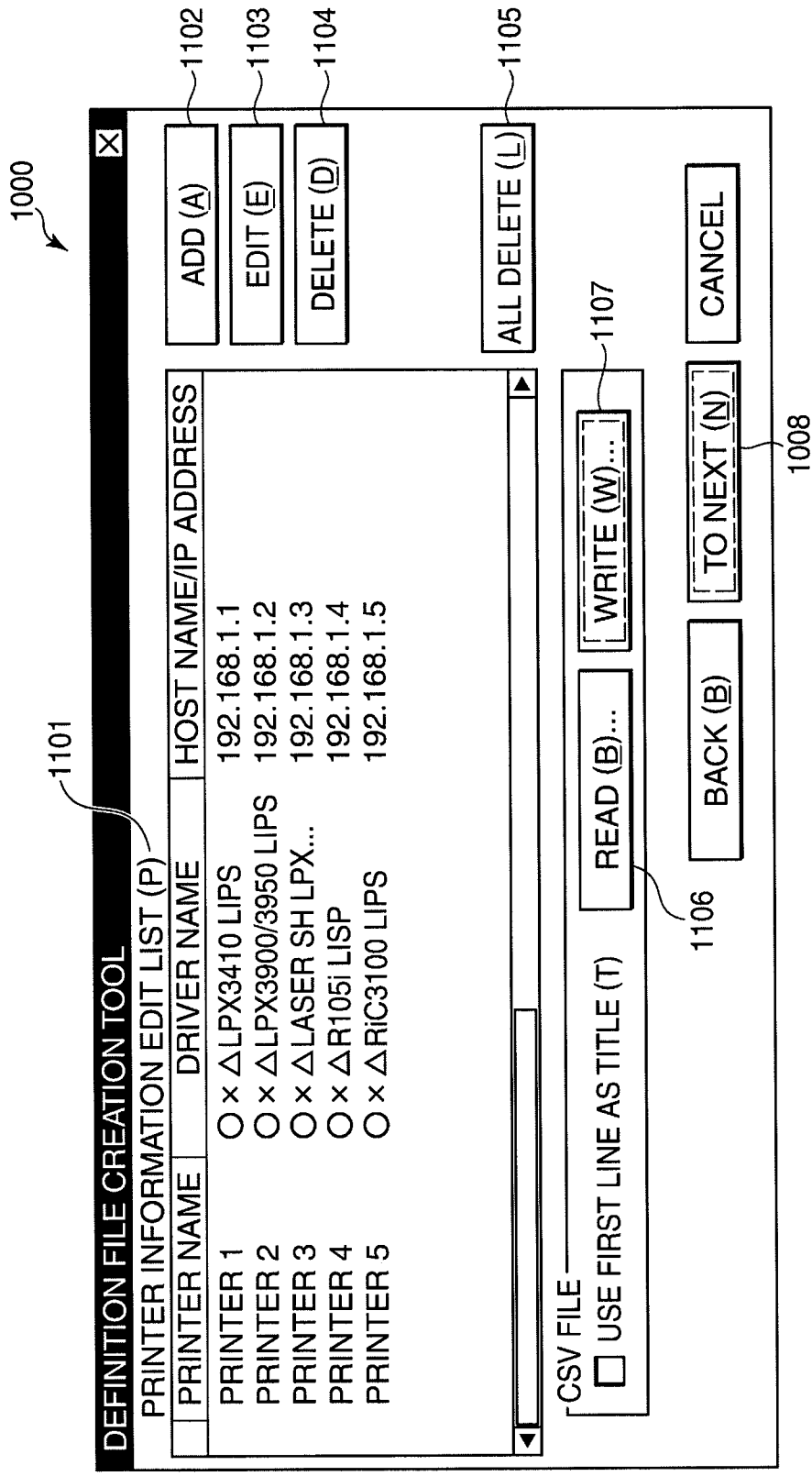
FIG. 11 is a view showing an example of printer information edit screen.
Figure 12:
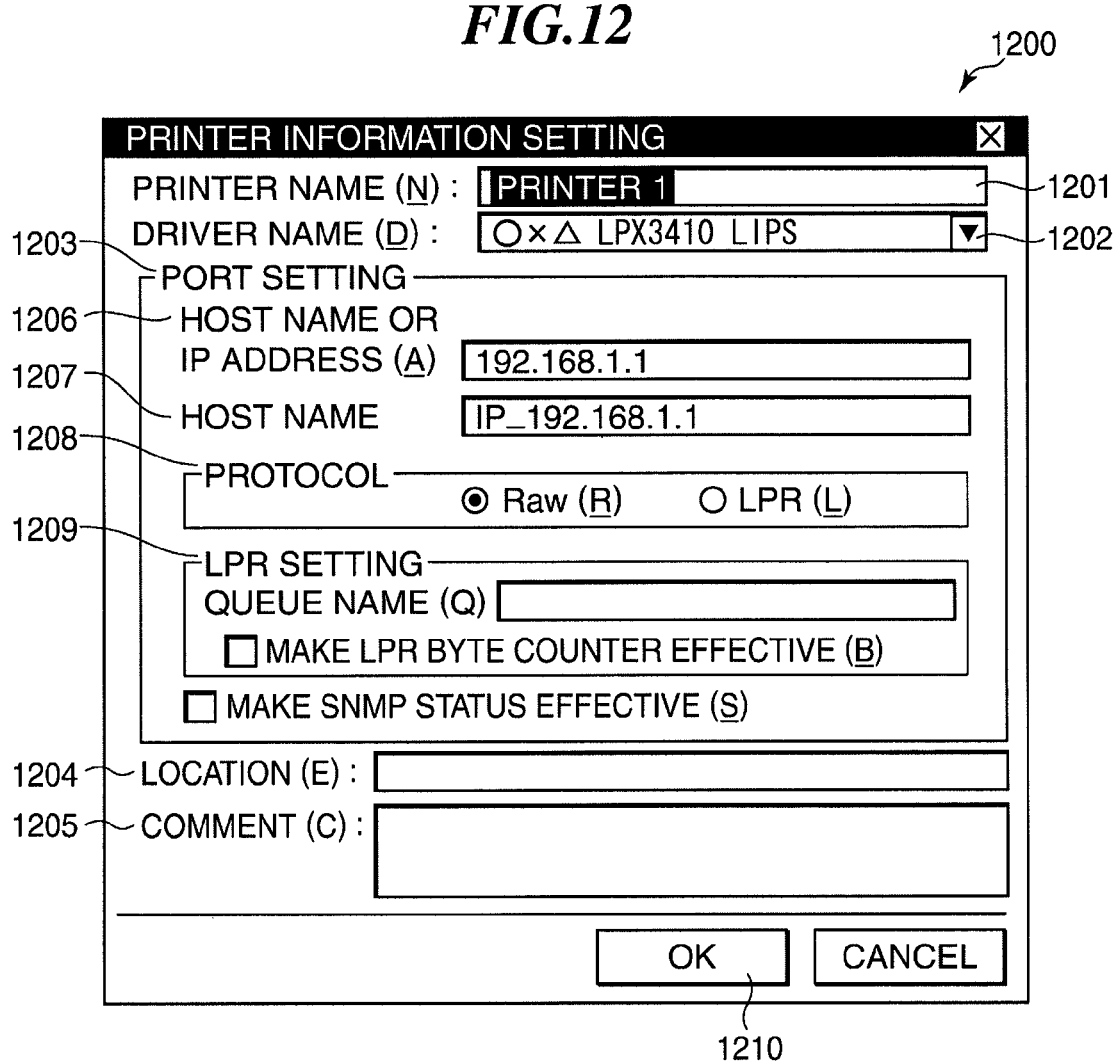
FIG. 12 is a view showing an example of printer information setting screen.

FIGS. 10, 11 and 12 show respective examples of definition-file creation mode screen, printer information edit screen, and printer information setting screen, which are each displayed on the display unit 210.

The definition-file creation mode screen 1000 shown in FIG. 10 is displayed as an initial screen at execution of the process shown in FIG. 5 described later, and is used to select whether a definition file is to be newly created or an existing definition file is to be edited. Whether the definition file is to be newly created or edited can be selected by using check-boxes in a definition-file creation mode selection field 1002. In the illustrated example, new definition file creation is selected.

On the definition-file creation mode screen 1000, a printer driver installer to be used (and a path thereof) can be designated by depressing a refer button 1001. When a "to next" button 1003 is depressed after the printer driver installer path is designated, a printer information edit screen 1100 shown in FIG. 11 is displayed.

Referring to FIG. 11, a list of setting information (printer information) necessary for installing printer drivers is displayed on a printer information edit list 1101. The printer information includes printer names, driver names, host names/IP addresses, port names, protocols, LPR setting values, locations, and comments.

When an add button 1102 or an edit button 1103 on the printer information edit screen 1100 is depressed, a printer information setting screen 1200 shown in FIG. 12 is displayed. By depressing a delete button 1104, printer information designated from the printer information edit list 1101 can be deleted. When an all delete button 1105 is depressed, all the pieces of printer information are deleted from the printer information edit list 1101.

Figure 13:
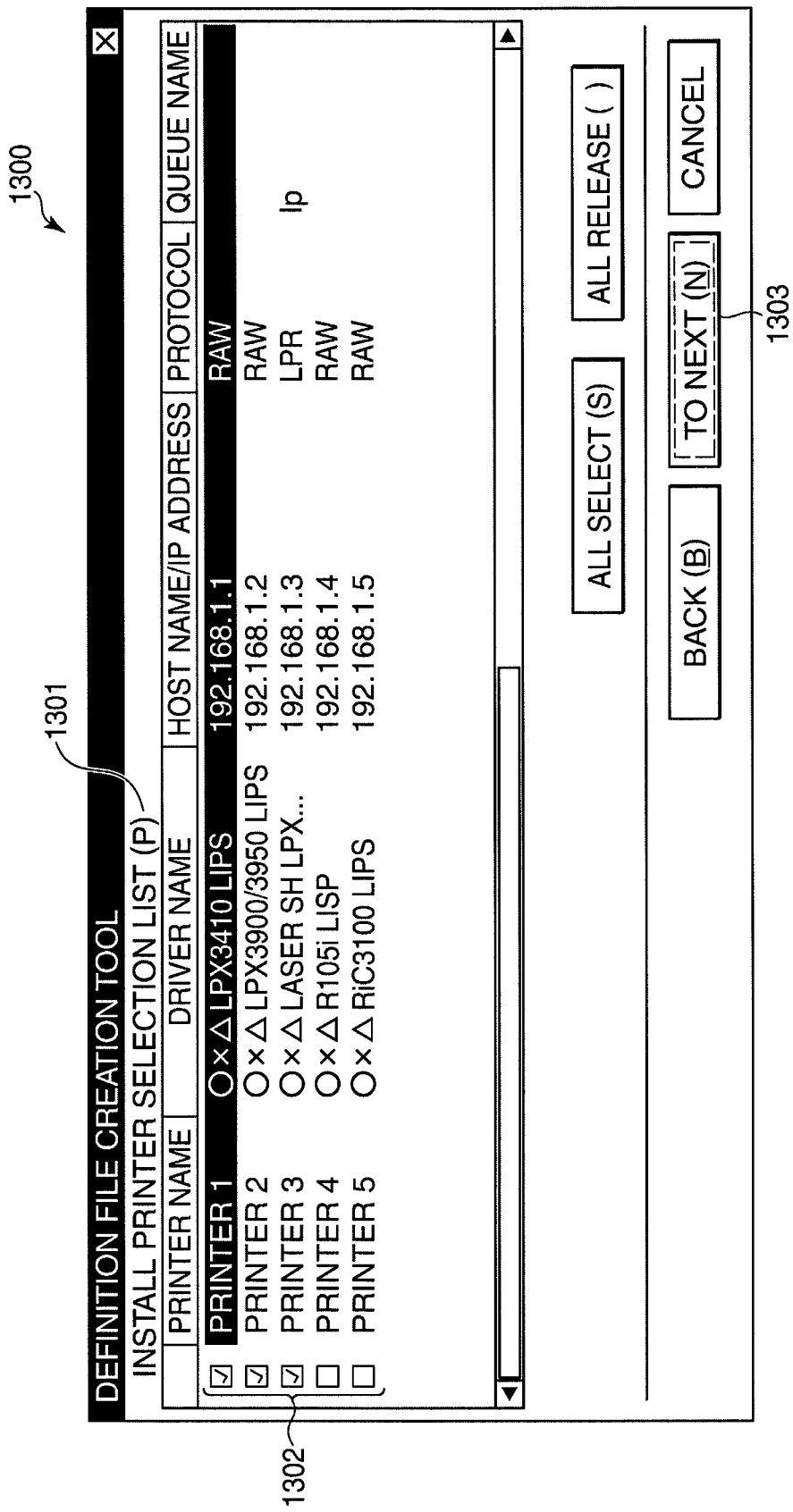
FIG. 13 is a view showing an example of install printer selection screen.

When a read button 1106 or a write button 1107 is depressed, printer information displayed on the printer information edit list 1101 is read or written in CSV file format. When a "to next" button 1108 is depressed, an install printer selection screen 1300 shown in FIG. 13 is displayed.

As shown in FIG. 12, new printer information can be set and printer information can be edited on the printer information setting screen 1200. A printer name setting field 1201, driver name setting field 1202, port setting field 1203, location setting field 1204, and comment setting field 1205 are provided on the setting screen 1200. A host name or IP address setting field 1206, port name setting field 1207, protocol setting field 1208, and LPR setting field 1209 are provided on the port setting field 1203.

When the add button 1102 on the printer information edit screen 1100 is depressed, default values of the above items are displayed on the printer information setting screen 1200. When the edit button 1103 is depressed, setting contents of printer information selected from the printer information edit list 1101 are displayed and can be edited.

When an OK button 1210 is depressed after new printer information is created or printer information is edited on the printer information setting screen 1200, the content of the information newly created or edited is reflected on the printer information in the printer information edit list 1101 in FIG. 11.

Figure 14:
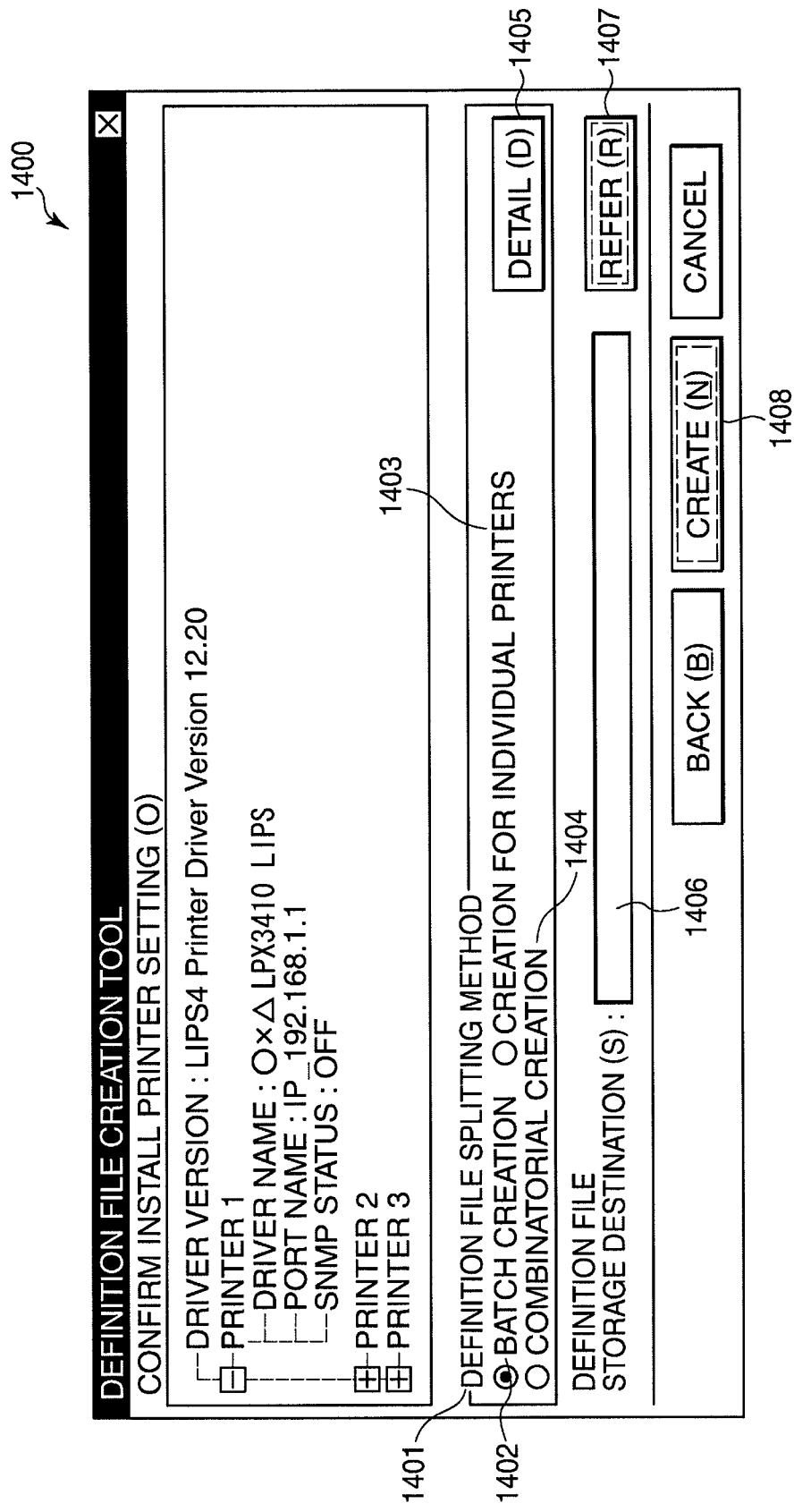
FIG. 14 is a view showing an example of definition-file storage path designation screen.

FIGS. 13 and 14 show respective examples of install printer selection screen and definition-file storage path designation screen.

In FIG. 13, there is shown an install printer selection screen 1300 for selecting printer information to be used for definition file creation from printer information added to the printer information edit list 1101.

Printer information displayed on the printer information edit list 1101 is displayed on an install printer selection list 1301 in a form able to be selected by using checkboxes 1302. The printer information selected with checkboxes 1302 is written into a definition file, as printer information to be installed. When a "to next" button 1303 is depressed, a definition-file storage path designation screen 1400 shown in FIG. 14 is displayed.

As shown in FIG. 14, the definition-file storage path designation screen 1400 is a screen for displaying a list of printer information selected on the install printer selection list 1301 with checkboxes 1302 (information set on the printer information setting screen 1200).

A definition file splitting method can be designated in a definition-file splitting method designation field 1401 on the definition-file storage path designation screen 1400. Heretofore, it has only been possible to create definition files in batch or individually. According to this invention, at least one definition file to be applied to printers grouped according to printer types can be created by one operation. The details thereof will be described later.

On the definition-file storage path designation screen 1400, a storage destination of definition file can be designated in a definition-file storage destination designation field 1406. The definition-file storage destination can be directly input into the definition-file storage destination designation field 1406, or can be designated by depressing a refer button 1407.

A "batch creation checkbox" 1402, a "creation for individual printer checkbox" 1403, and a "combinatorial creation checkbox" 1404 are provided in the definition-file splitting method designation field 1401. With the "batch creation checkbox" 1402, a creation mode for creating definition files in batch can be designated. With the "creation for individual printer checkbox" 1403, a creation mode for individually creating definition files for respective printers can be designated. With the "combinatorial creation checkbox" 1404, a creation mode for combinatorially creating definition files can be designated.

Figure 15:
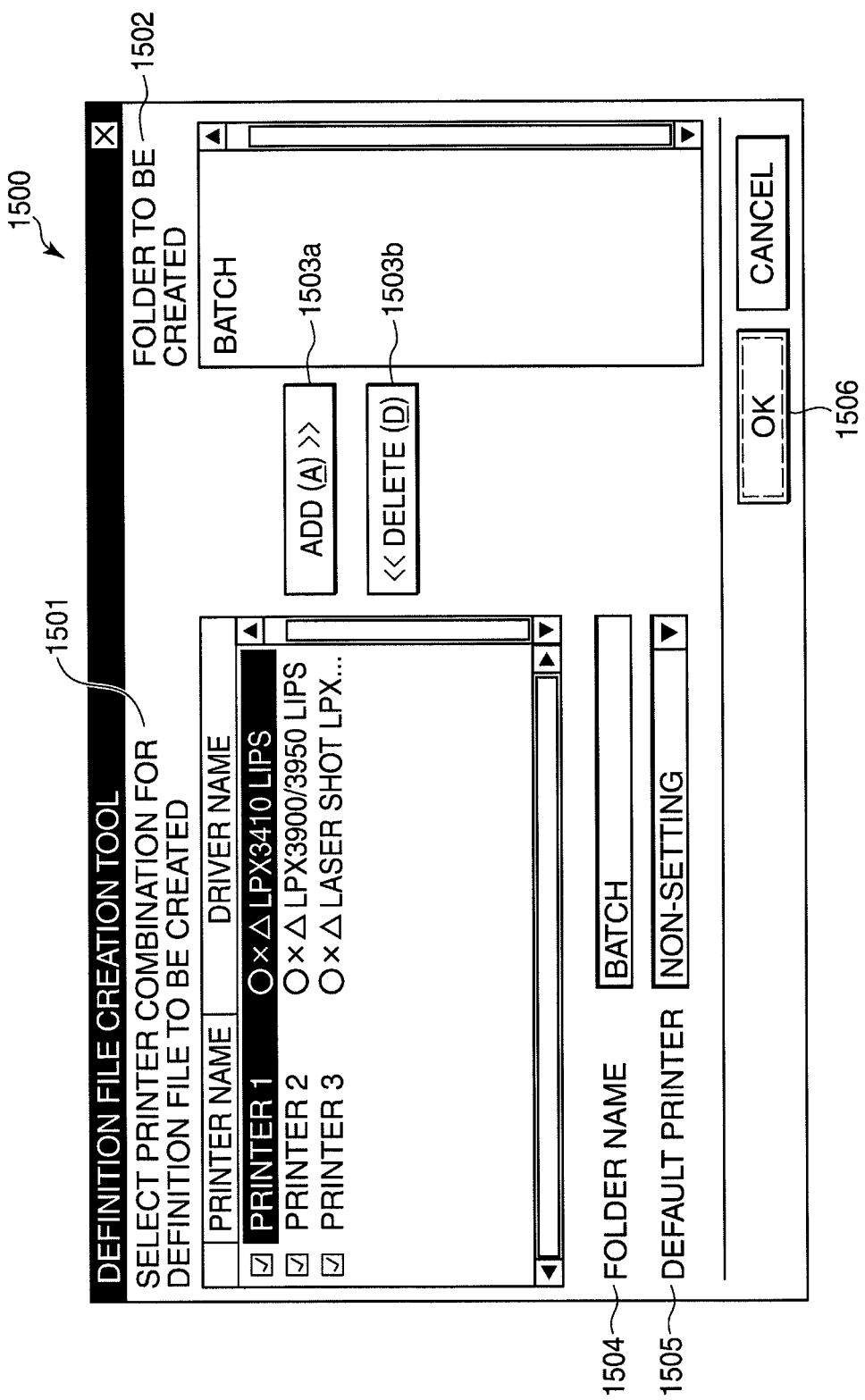
FIG. 15 is a view showing an example of definition-file splitting detail setting screen.

When a detail button 1405 is depressed after any of the checkboxes is designated on the definition-file splitting method designation field 1401, a definition-file splitting detail setting screen 1500 shown in FIG. 15 is displayed.

When a create button 1408 is depressed on the definition-file storage path designation screen 1400, an installer set creation process of FIG. 7 described later is started.

As shown in FIG. 15, a left-hand list 1501, right-hand list 1502, add button 1503a, delete button 1503b, folder name setting field 1504, and default printer setting field 1505 are provided on the definition-file splitting detail setting screen 1500.

A list of printer information for which definition files are to be created is displayed on the left-hand list 1501. A list of folders (names thereof) for storing definition files is displayed on the right-hand list 1502. The folder name setting field 1504 is a field for inputting a name of folder to be created. The add button 1503a is a button for adding to the right-hand list 1502 the folder name input to the folder name setting field 1504.

When printer information is selected in left-hand list 1501, a folder name is input to the folder name setting field 1504, and then the add button 1503a is depressed, the folder name is displayed on the right-hand list 1502.

The delete button 1503b is a button for deleting a folder name arbitrarily selected from the right-hand list 1502. The default printer setting field 1505 is a combo box for selecting a default printer from printers selected on the left-hand list 1501. The setting/non-setting can be specified for every definition file.

When an OK button 1506 is depressed, the respective items set on the definition-file splitting detail setting screen 1500 are reflected, and the screen is returned to the definition-file storage path designation screen 1400.

Figure 16:
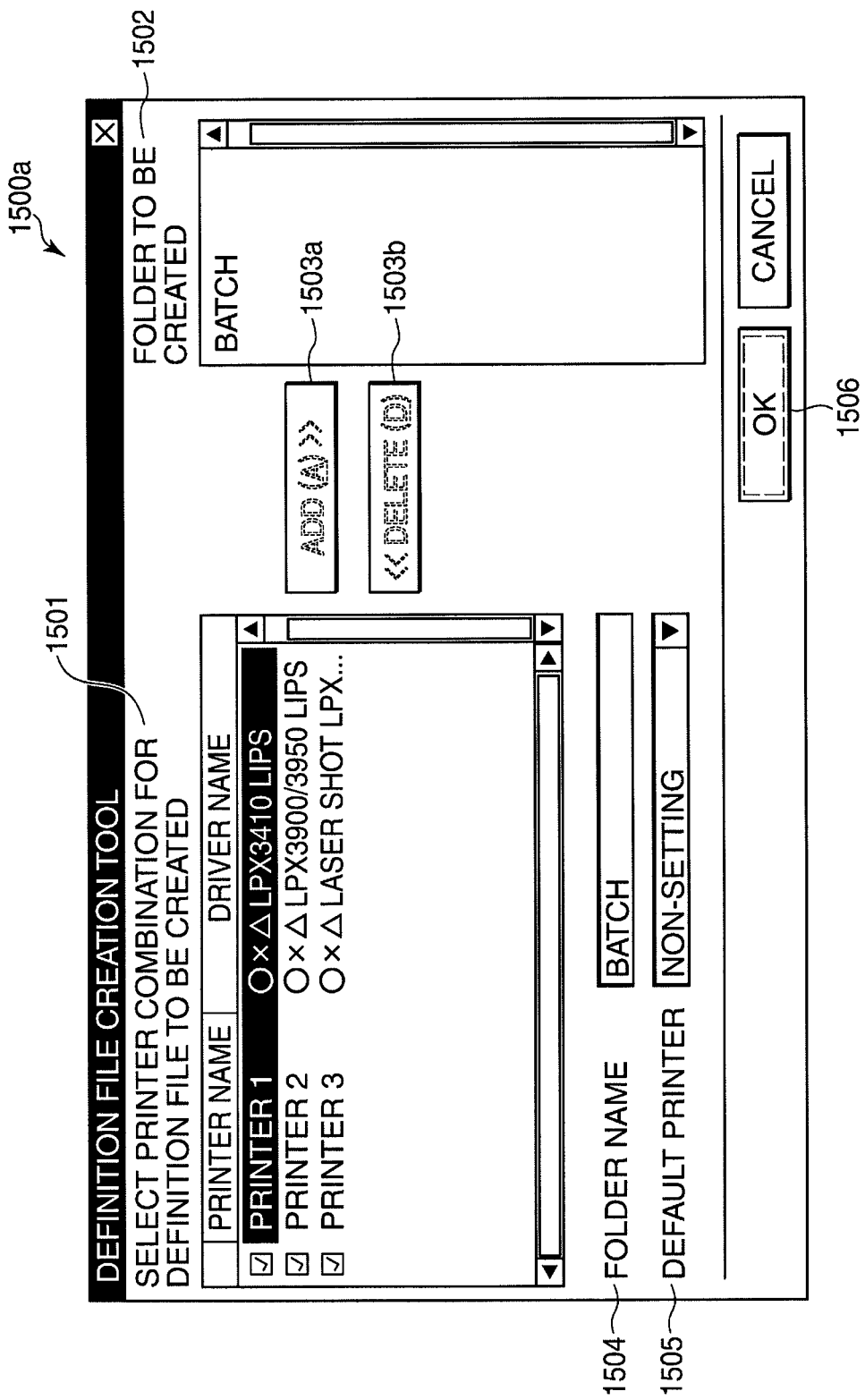
FIG. 16 is a view showing an example of definition-file splitting detail setting screen, which is displayed when a batch creation mode is designated.
Figure 17:
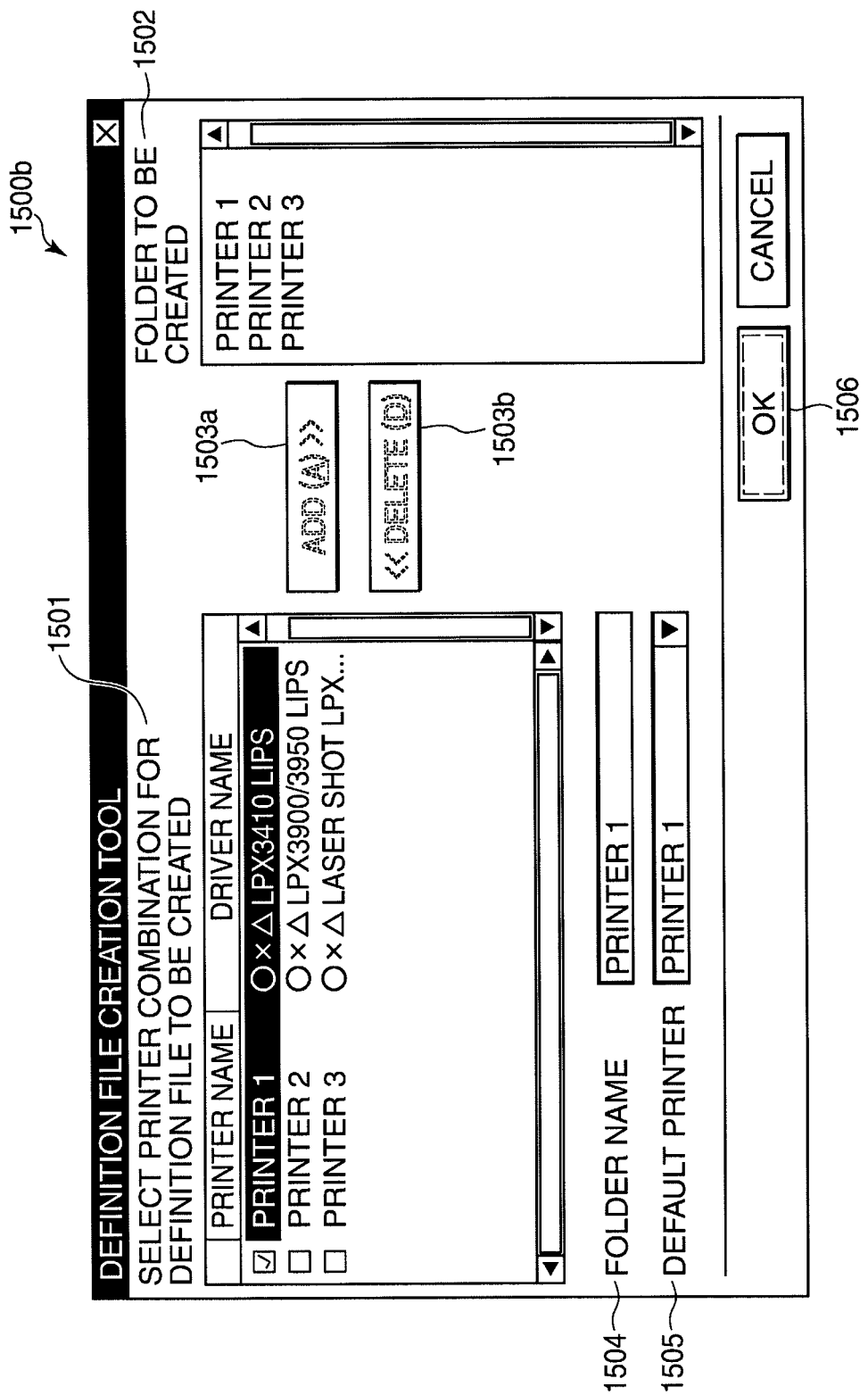
FIG. 17 is a view showing an example of definition-file splitting detail setting screen displayed when an individual creation mode is designated.
Figure 18:
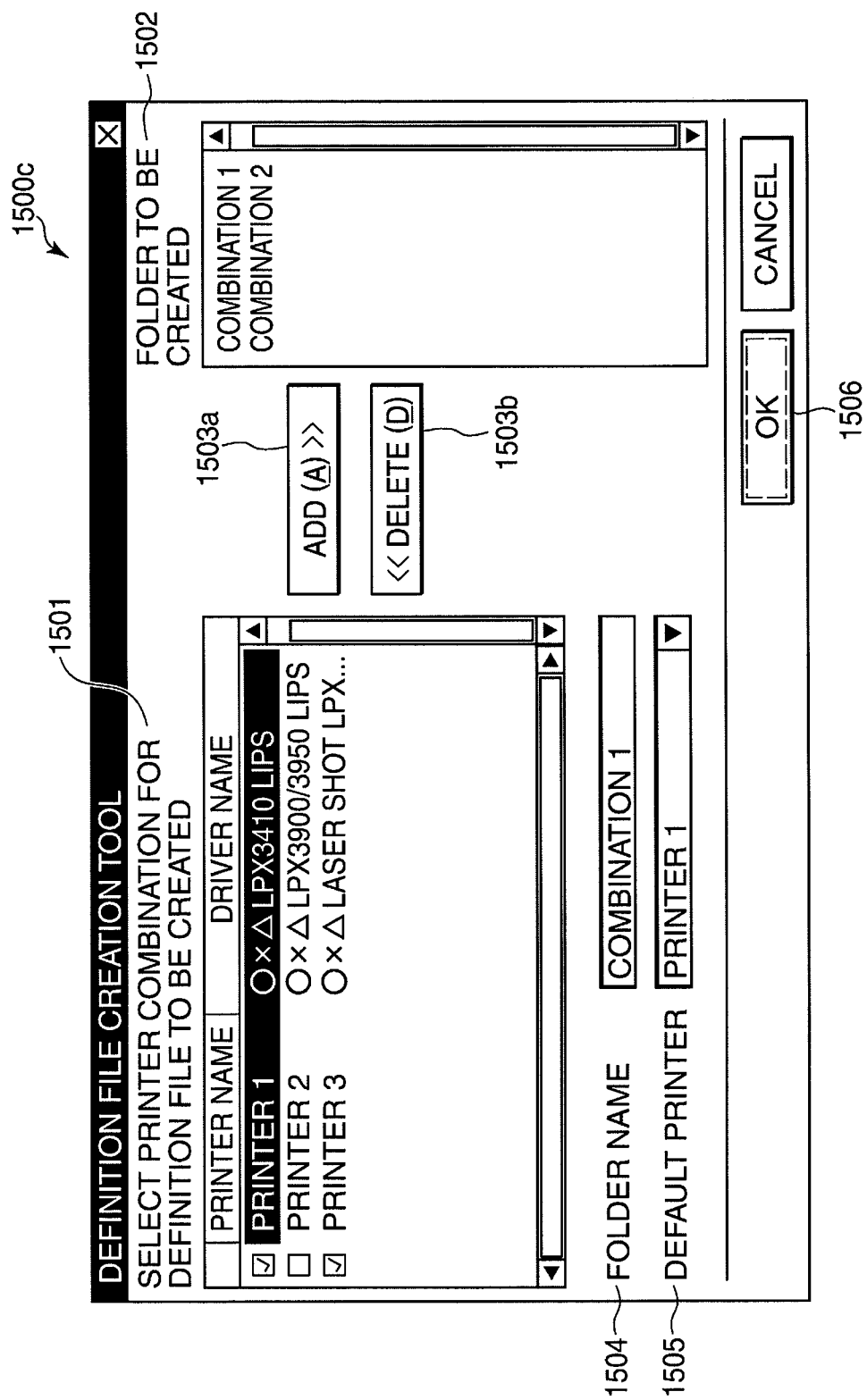
FIG. 18 is a view showing an example of definition-file splitting detail setting screen displayed when a combinatorial creation mode is designated.

FIGS. 16 to 18 show examples of detail setting screen displayed according to the designated definition file splitting method.

Default display displayed on the definition-file splitting detail setting screen 1500 differs depending on the splitting method designated on the definition-file splitting method designation field 1401 of the definition-file storage path designation screen 1400.

Figure 20A:
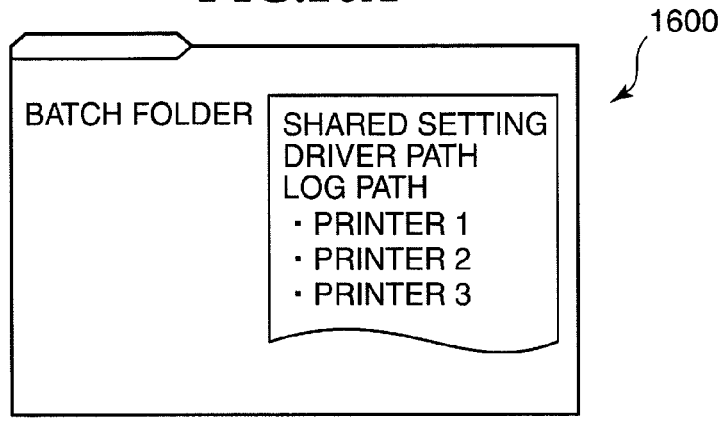
FIGS. 20A to 20C are views respectively showing examples of folders obtained in the batch creation mode, individual creation mode, and combinatorial creation mode.

In a case where the batch creation checkbox 1402 (batch creation mode) is designated on the definition-file splitting method designation field 1401, a definition-file splitting detail setting screen 1500a shown in FIG. 16 is displayed. In the batch creation mode, a definition file and execution file that enable the selected printer information to be installed in batch are created and stored into one folder 1600 as shown in FIG. 20A.

Figure 20B:
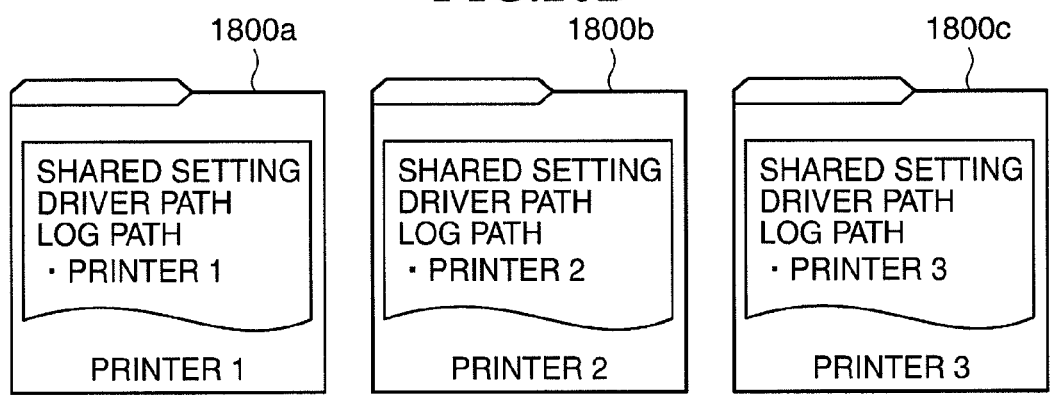

In a case where the "creation for individual printer" (individual creation mode) is designated on the definition-file splitting method designation field 1401, a definition-file splitting detail setting screen 1500b shown in FIG. 17 is displayed. In the individual creation mode, definition files and execution files that enable the selected printer information to be individually installed are created and stored into individual folders 1800a to 1800c as shown in FIG. 20B.

In the individual creation mode, folder names for respective pieces of printer information which are individually selected on the left-hand list 1501 are displayed on the right-hand list 1502. When the add button 1503a is depressed after pieces of printer information are individually selected on the left-hand list 1501 and folder names are input into the folder name setting field 1504, folders for respective pieces of the selected printer information are created in accordance with a predetermined rule. For example, folder names each indicated by "1" representing printer 1 and followed by a suffix numeral are decided and displayed on the right-hand list 1502.

Figure 20C:
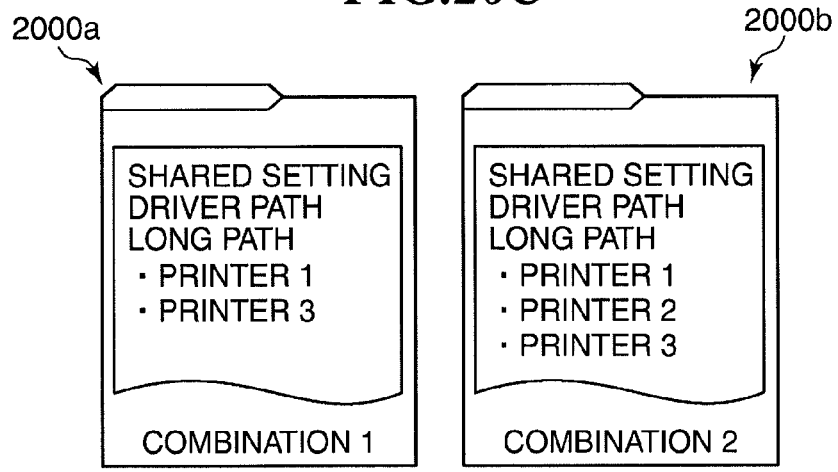

In a case where the combinatorial creation (combinatorial creation mode) is designated on the definition-file splitting method designation field 1401, a definition-file splitting detail setting screen 1500c shown in FIG. 18 is displayed. In the combinatorial creation mode, in accordance with an administrator's instruction, definition files and execution files in each of which pieces of arbitrarily selected printer information are combined are created and stored into folders 2000a, 2000b corresponding in number to the combinations as shown in FIG. 20C.

In the combinatorial mode, when the add button 1503a is depressed after arbitrary pieces (not all pieces) of printer information are selected on the left-hand list 1501 and folder names are input to the folder name setting field 1504, folder names of folders corresponding in number to the selected pieces of printer information are displayed on the right-hand list 1502 in accordance with a predetermined rule.

When the OK button 1506 is depressed on any of the definition-file splitting detail setting screens 1500a to 1500c, input information is stored into a memory B which is a storage region set in the RAM 203 or the memory 211. Examples of information stored into the memory B are shown in FIGS. 23A to 23C.

Figure 23A:
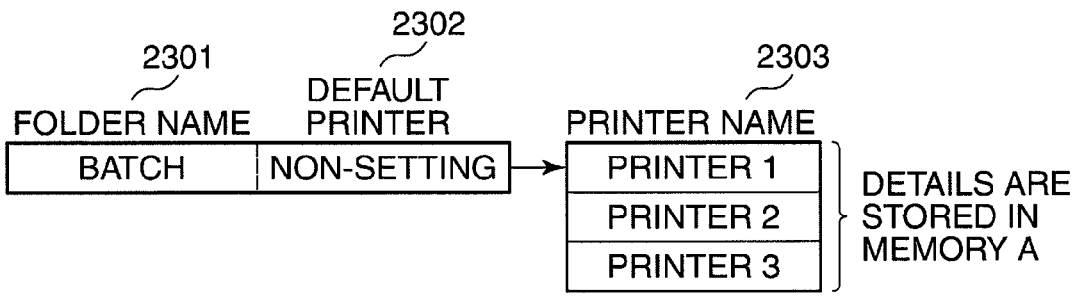
FIGS. 23A to 23C are views respectively showing the formats of information stored in a memory B set in the RAM or the memory in the batch creation mode, individual creation mode, and combinatorial creation mode.
Figure 23B:
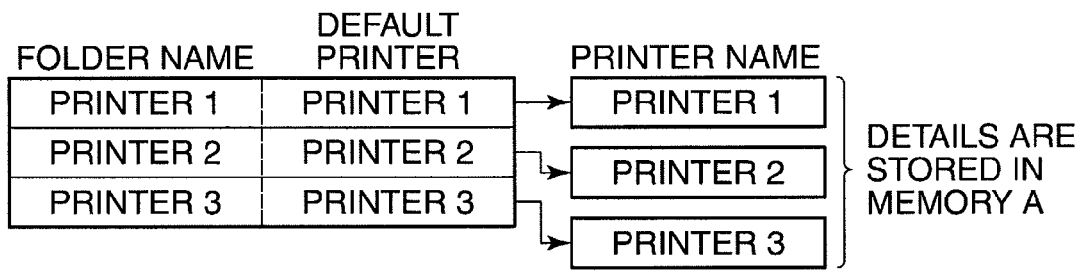
Figure 23C:
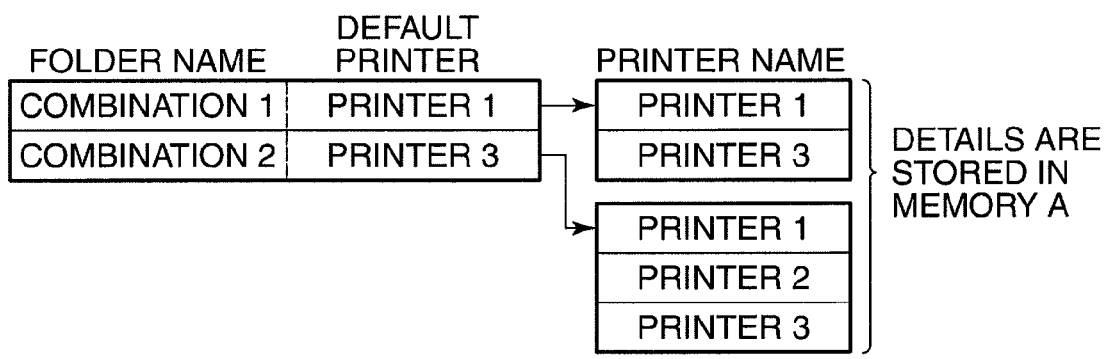

As shown in FIGS. 23A to 23C, initial values are stored into the memory B when the definition-file storage path designation screen 1400 is displayed. As the Initial values, there may be mentioned, for example, the printer names selected on the left-hand list 1501, the splitting method designated on the definition-file splitting method designation field 1401, the folder names selected on the folder name setting field 1504, and the default printers selected on the default printer setting field 1505. When the splitting method (creation mode) in the definition-file splitting method designation field 1401 is subsequently changed, the above values are changed in accordance with the change. When the OK button 1506 is depressed, finally decided values are reflected. The details thereof will be described later.

In a case where the batch creation mode is selected, printer information (printer names 2303) for all the printers and folder names 2301 input to the folder name setting field 1504 are stored into the memory B so as to correspond to one another, as shown in FIG. 23A. It should be noted that printer information for printers 1 to 3 are stored into the memory A in the illustrated example shown in FIG. 23A (Ditto in FIGS. 23B and 23C).

In a case where the individual creation mode is selected, printer information for respective ones of individually selected printers and folder names 2301 input to the folder name setting field 1504 are stored into the memory B so as to correspond to one another, as shown in FIG. 23B.

In a case where the combinatorial creation mode is selected, combinations of printer information for arbitrarily selected printers and folder names 2301 input to the folder name setting field 1504 are stored into the memory B so as to correspond to one another, as shown in FIG. 23C.

FIG. 22 shows an example of information stored in the memory A.

As shown in FIG. 22, pieces of printer information (e.g., printer names, etc.) displayed on the printer information edit list 1101 are stored into the memory A, and states of selection of the checkboxes 1302 on the install printer selection list 1301 are reflected on selection flags 2201. Pieces of printer information, which are set/selected on the printer information edit screen 1100, are stored into items "printer name" 2203, "driver name" 2204, and "other settings" 2205. Values thereof are written into sections 2104 of definition file shown in FIG. 21. The details thereof will be described later.

FIG. 21 shows an example of definition file.

Referring to FIG. 21, in a driver section 2102, there is a description relating to the printer driver installer designated by depressing the refer button 1001. In a printers section 2103, the printer names selected on the left-hand list 1501 are described. For each printer name, printer information including printer name 2203, driver name 2204, and other settings 2205 is described in a corresponding one (printer 1, printer 2, . . . ) of the sections 2104. The sections 2104 correspond in number to the printers described in the printers section 2103. The above definition file is created for each installer set.

Next, a definition file creation process executed by the server 103 is described.

Figure 5:
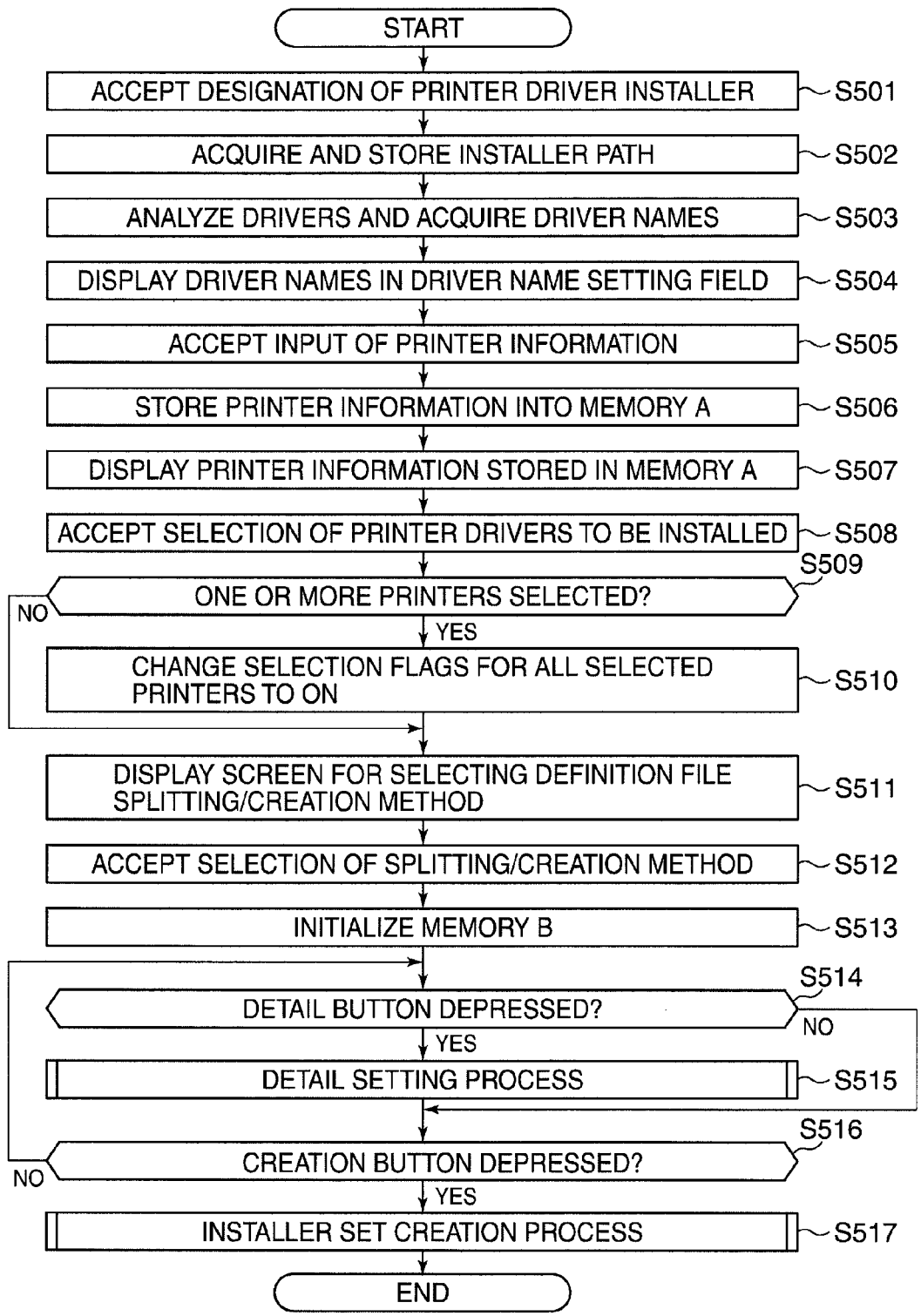
FIG. 5 is a flowchart showing an example of a definition file creation process executed by the server.

FIG. 5 shows in flowchart an example of definition file creation process executed by the server 103. It should be noted that the illustrated process is executed by the functions of the printer selecting unit 401, definition file creating unit 402, and installer set creation unit 403 in the server 103, For convenience of explanation, however, it is assumed that this process is executed by the CPU 201.

Referring to FIG. 5, when the definition file creation tool 302 is activated, the CPU 201 displays the definition-file creation mode screen 1000 on the display unit 210, and accepts designation of a printer driver installer (step S501). The administrator depresses the refer button 1001 on the definition-file creation mode screen 1000, thereby designating a printer driver installer to be used to install printer drivers.

Next, the CPU 201 acquires a path for the designated printer driver installer and stores it into the RAM 203 or the memory 211 (step S502). Then, the CPU 201 refers to INF files in printer drivers stored in the designated printer driver installer, and acquires all the driver names (step S503). It should be noted that positions of INF files in printer drivers are decided beforehand according to driver specifications, and the printer drivers are analyzed according to the driver specifications.

Next, the CPU 201 displays the driver names acquired in step S503 on the driver name setting field 1202 of the printer information setting screen 1200, which is displayed in response to, e.g., the add button 1102 being depressed (step S504). It should be noted that printer driver in this embodiment is a family driver that supports a set of drivers for a plurality of models (or devices) by using a shared installer. Driver names of all the printers supported by the family driver are therefore described in its INF file, and these driver names are displayed on the driver name setting field 1202. In a case that a printer driver, other than family driver, which supports only one model is selected, only a driver name for that model is displayed.

Next, the CPU 201 displays the printer information setting screen 1200, and accepts selection of driver on the driver name setting field 1202 and input of printer information relating to other required items (printer name, IP address, protocol, etc.) (step S505). When the OK button 1210 is depressed, the values selected/input in step S505 are stored into the memory A in the form shown in FIG. 22 (step S506). Specifically, an OFF is stored into all the selection flags 2201, the values (printer names) each input to the printer name setting field 1201 are stored into the items "printer name" 2202, 2203, and the values (driver names) each selected in the driver name setting field 1202 are stored into the items "driver name" 2204. Further, the values (port name, IP address, and location) input on the printer information setting screen 1200 are stored into the items "other settings" 2205.

Next, the pieces of printer information stored into the memory A in step S506 are displayed on the printer information edit list 1101 and the install printer selection list 1301 (step S507). Specifically, the values stored into the memory A in step S506 are displayed on the printer information edit list 1101. When the "to next" button 1108 is depressed, the install printer selection list 1301 is displayed based on the values stored in the memory A.

Next, the CPU 201 accepts selection of printers to be installed (step S508), the selection being made by using checkboxes 1302 on the install printer selection list 1301. The administrator is able to depress the "to next" button 1303 after checking the checkboxes 1302 corresponding to the desired printers. The CPU 201 determines whether there are one or more selected checkboxes (step S509). If there are one or more selected checkboxes, the CPU proceeds to step S510. Otherwise, the CPU proceeds to step S511.

The CPU 201 changes selection flags 2201, corresponding to all the printers selected with checkboxes 1302, to ON (step S510), and displays the definition-file storage path designation screen 1400 (step S511).

Next, the CPU 201 accepts a splitting/creation method designated on the definition-file splitting method designation field 1401 (step S512). The administrator designates (decides) a desired one of the "batch creation checkbox" 1402, the "creation for individual printer checkbox" 1403, and the "combinatorial creation checkbox" 1404. Instead of designating one of the checkboxes 1402 to 1404, there may be configured that either the batch creation checkbox 1402 or the creation for individual printer checkbox 1403 is designated or that either the batch creation checkbox 1402 or the combinatorial creation checkbox 1404 is designated.

Then, in accordance with the designated creation mode, the CPU 201 creates a self-extracting setup.exe (execution file) 1906 as shown in FIG. 19. The setup.exe 1906 is comprised of a start-up module file 1907, binary data 1908 of a file having the compressed installer set, and a header file 1909.

In a case where the batch creation mode is designated, one setup.exe 1906 is created. In a case where the individual creation mode is designated, pieces of setup.exe 1906 corresponding in number to the selected printers (printer information) are created. In a case where the combinatorial creation mode is selected, pieces of setup.exe 1906 corresponding in number to folders displayed in the right-hand list 1502 are created.

Next, the CPU 201 performs initial setting (initial values) of the memory B in accordance with the definition file splitting/creation method designated in step S512 (step S513). This is to cope with a case where the settings are not performed on the definition-file splitting detail setting screen 1500, which is displayed when the detail button 1405 on the definition-file storage path designation screen 1400 is depressed. It should be noted that in the batch creation mode and the individual creation mode, the definition file can be created without depressing the detail button 1405.

Information stored in the memory B differs depending on the splitting method (creation mode) designated on the definition-file splitting method designation field 1401. In a case where the batch creation mode is selected, a term "batch" (which is not limitative, and may be any other fixed value) is stored into the item "folder name" 2301, a term "non-settings" (which may be any fixed value, e.g., a first printer among printer names 2202) is stored into the item "default printer" 2302, and all the printers whose selection flags 2202 are ON are stored into the items "printer name" 2303.

In a case where the individual creation mode is selected, printer names 2202 for printers whose selection flags 2201 are ON are stored into the items "folder name" 2301, "default printer" 2302, and "printer name" 2303.

In a case where the combinatorial creation mode is selected, NULL is stored into all the items "folder name" 2301, "default printer" 2302, and "printer name" 2303.

Next, the CPU 201 determines whether the detail button 1405 on the definition-file storage path designation screen 1400 is depressed (step S514). When determining that the detail button is depressed, the CPU proceeds to step S515. Otherwise, it proceeds to step S516.

In step S515, the CPU 201 displays the definition-file splitting detail setting screen 1500, and executes a detail setting process by using values stored in the memory B. It should be noted that if some value is changed on the definition-file splitting detail setting screen 1500, a relevant value stored in the memory B is also changed. The details of the detail setting process will be described later.

Next, the CPU 201 determines whether the create button 1408 on the definition-file storage path designation screen 1400 is depressed (step S516). When determining that the create button is depressed, the CPU proceeds to step S517. Otherwise, it proceeds to step S514.

In step S517, the CPU 201 stores into the installer set folder 1901 the printer driver installer designated in step S501 and the definition file which is output (created) based on information read from the memories A, B, and executes an installer creation process for converting into a self-extracting file, whereupon the present process is completed. The details of the installer creation process will be described later.

Figure 6:
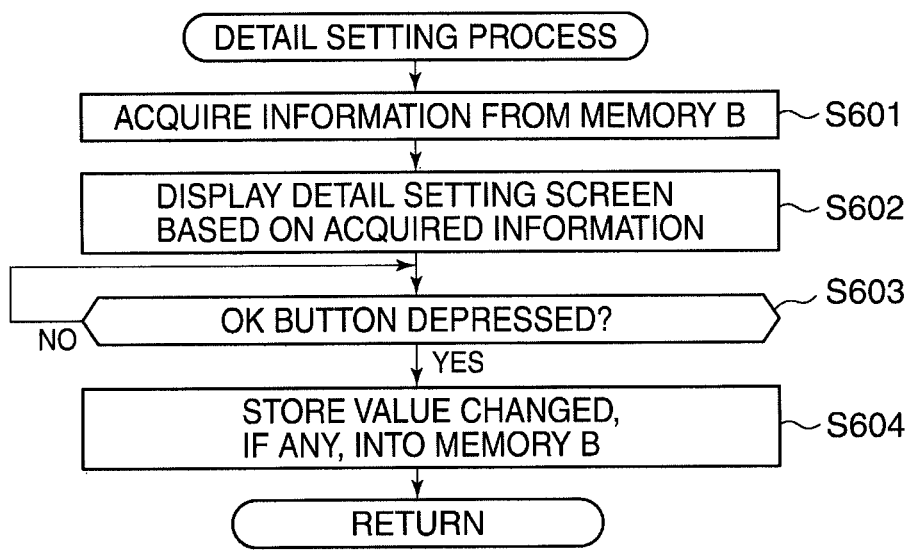
FIG. 6 is a flowchart showing the details of a detail setting process performed in step S515 in FIG. 5.

FIG. 6 shows in flowchart the details of the detail setting process performed in step S515 in FIG. 5.

As shown in FIG. 6, the CPU 201 acquires information (initial values) from the memory B initialized in step S513 (step S601). Next, based on the information acquired in step S601, the CPU 201 displays the definition-file splitting detail setting screen 1500 on the display unit 210 (step S602). Printer names 2202 whose selection flags 2201 in the memory A are ON are displayed on the left-hand list 1501, and folder names 2301 in the memory B are displayed on the right-hand list 1502.

Folder names selected on the right-hand list 1502 are displayed on the folder name setting field 1504. Default printers 2302 of the folder names selected on the right-hand list 1502 are displayed on the default printer setting field 1505.

The method of display control for the definition-file splitting detail setting screen 1500 differs depending on the creation mode designated in the definition-file splitting method designation field 1401.

In a case where the batch creation mode is designated, the screen control is performed, as shown in FIG. 16, such that checkboxes on the left-hand list 1501 for all the printers are selected and cannot be unmarked, the add button 1503a and delete button 1503b cannot be depressed, and contents of the folder name setting field 1504 and default printer setting field 1505 can be changed.

In a case where the individual creation mode is designated, the screen control performed as shown in FIG. 17 such that checkboxes on the left-hand list 1501 for printers paired with printers in the right-hand list 1502 are marked, the add button 1503a and delete button 1503b cannot be depressed, and contents of the folder name setting field 1504 and the default printer setting field 1505 can be changed.

In a case where the combinatorial creation mode is designated, the screen control is made as shown in FIG. 18 such that checkboxes on the left-hand list 1501 for all the printers are not marked, the add button 1503a and delete button 1503b can be depressed, and contents of the folder name setting field 1504 and default printer setting field 1505 are empty and can be changed.

Next, the CPU 201 determines whether the OK button 1506 is depressed on the definition-file splitting detail setting screen 1500 (step S603). When determining that the OK button is depressed, the CPU proceeds to step S604. Otherwise, the CPU stands by. In step S604, the CPU 201 does nothing, if there is no change on the definition-file splitting detail setting screen 1500. If there is a change, a value changed is stored into the memory B, and the process returns to the beginning.

Figure 7:
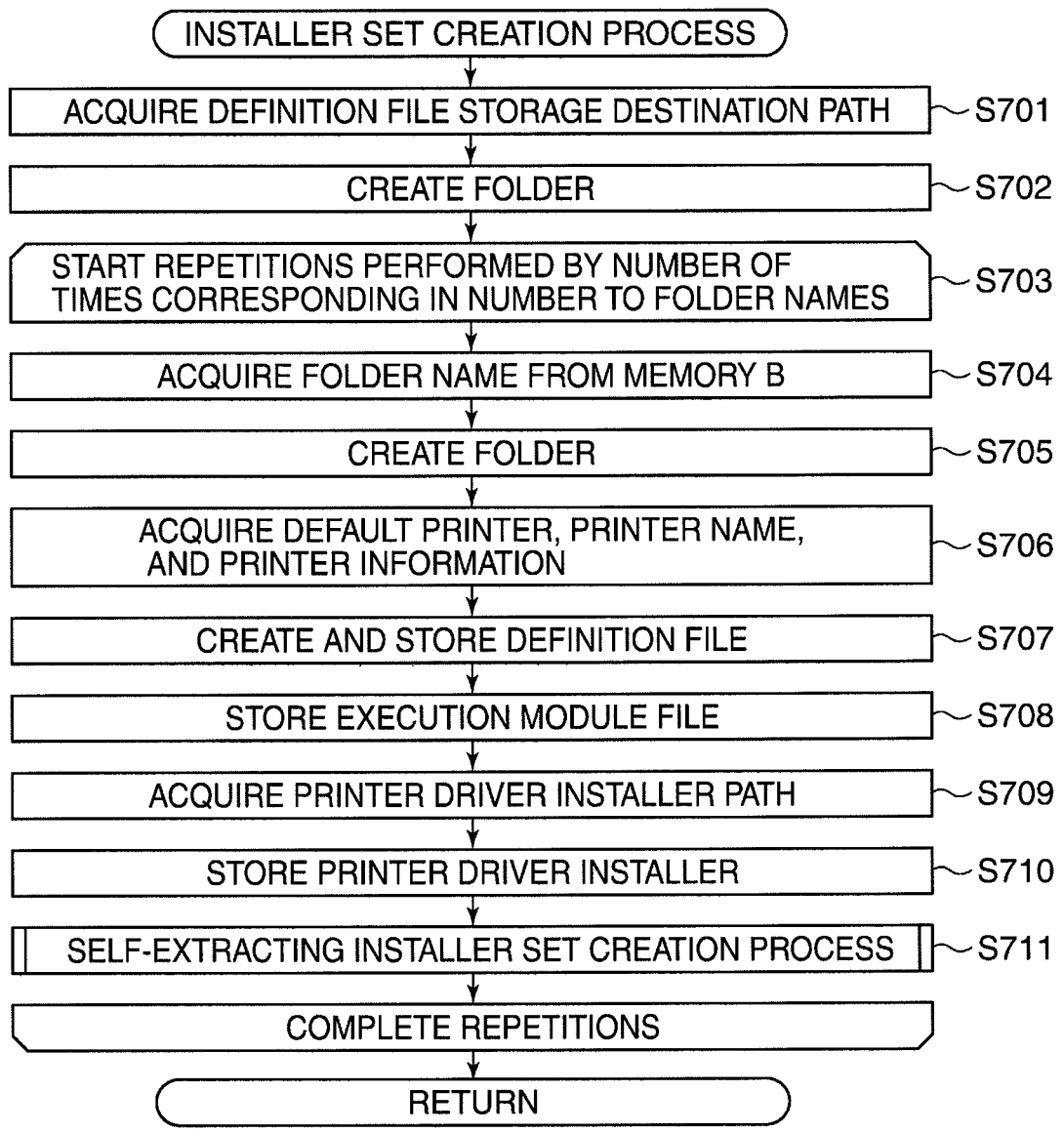
FIG. 7 is a flowchart showing an installer set creation process performed in step S517 in FIG. 5.

FIG. 7 shows in flowchart the installer set creation process performed in step S517 in FIG. 5.

As shown in FIG. 7, the CPU 201 acquires a path from the definition-file storage destination designation field 1406 (step S701). At the path acquired in step S701, the CPU 201 creates an installer set folder 1901 as shown in FIG. 19 (step S702). Next, in step S703, the CPU starts to repeat steps S704 to S711 by the number of times corresponding to the number of folder names 2301 stored in the memory B, so as to create folders 1903 corresponding in number to the folder names 2301 stored in the memory B.

Next, the CPU 201 acquires one of the folder names from the memory B (step S704), creates a folder 1903 by using the folder name acquired in step S704 (step S705), and acquires a corresponding default printer 2302 and printer name 2303 stored in the memory B, and corresponding printer information stored in the memory A (step S706).

Next, the CPU 201 outputs (creates) a definition file as shown in FIG. 21 based on the values and information acquired in step S706, stores the definition file into the folder 1903 (step S707), and stores into the folder 1903 an execution module file prepared beforehand (step S708). The execution module file is software for installing a printer diver by using a printer driver installer based on definition file information.

It should be noted that the printer driver installer is configured to be able to install the printer driver by using an API such as AddPrinter. Various settings for printer can be made by using an API, e.g., SetPrinter, for setting (changing) printer information.

Next, the CPU 201 acquires a path for the printer driver installer designated on the definition-file creation mode screen 1000 (step S709), acquires a printer driver installer by using the path acquired in step S709, and stores the acquired printer driver installer into a folder 1902 (step S710).

Next, the CPU 201 executes a self-extracting installer set creation process to convert the installer set created in steps S707 to S710 into a self-extracting setup.exe 1906 as shown in FIG. 19 (step S711).

Figure 8:
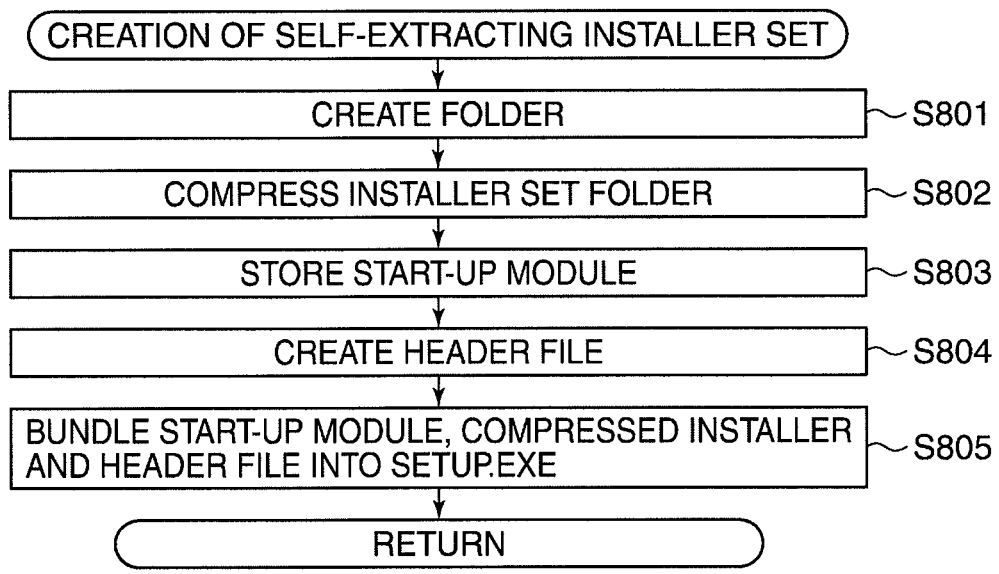
FIG. 8 is a flowchart showing the details of an installer set creation process performed in step S711 in FIG. 7.

FIG. 8 shows in flowchart the details of the installer set creation process performed in step S711 in FIG. 7. It should be noted that although the illustrated process is executed by the function of the installer set creation unit 403 of the server 103, it is assumed that the process is executed by the CPU 201 for convenience of explanation.

As shown in FIG. 8, the CPU 201 creates an installer set folder 1901 based on one of the folder names 2301 stored in the memory B (step S801), compresses the printer driver installer, and stores it into the installer set folder 1901 created in step S801 (step S802). The compression method may be an ordinary one. For example, a Windows (registered trademark) standard tool, makecab.exe, can be used.

Next, the CPU 201 stores into the setup.exe 1906 a start-up module file 1907 prepared beforehand (step S803). The "start-up module file" is software which is first read when the self-extracting file is activated. The start-up module file has functions of reading a header file created in step S804 (described later), extracting the printer driver installer file compressed in step S802, and activating an execution path written in the header file.

Then, the CPU 201 creates the header file describing the size of the compressed printer driver installer created in step S802, execution path for execution module 1904, and size of the header file (step S804), and creates the self-extracting setup.exe 1906 by binarizing the compressed printer driver installer, start-up module file, and header file (step S805).

The following is a description of an operation process performed when the self-extraction file is executed by, e.g., the client terminal 101.

Figure 9:
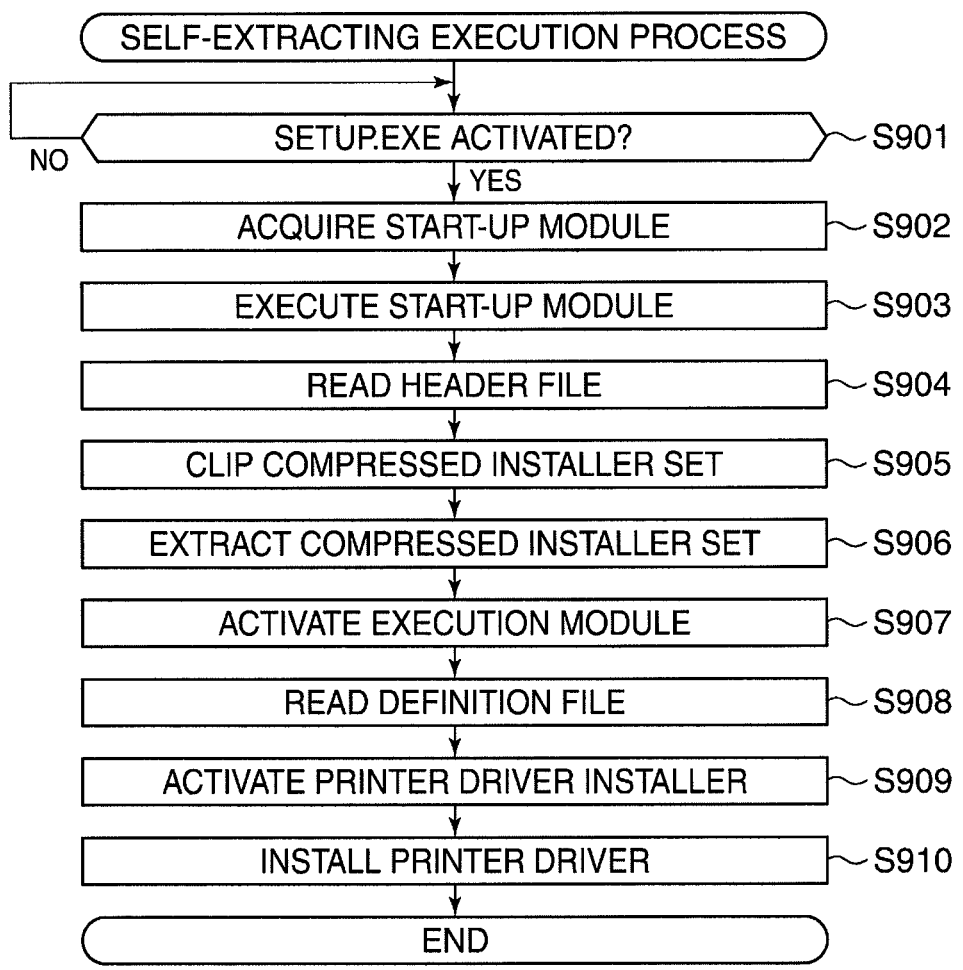
FIG. 9 is flowchart showing an example operation process performed when a self-extracting file is executed by a client terminal.

FIG. 9 shows in flowchart an example operation process performed when a self-extracting file is executed by a client terminal. It should be noted that although the illustrated process is executed by the function of the install unit 404 of the client terminal, it is assumed that the process is executed by the CPU 201 for convenience of explanation.

The execution of self-extracting file indicates that the self-extracting file created in step S805 is activated by, e.g., being double clicked by the administrator. The self-extracting file is downloaded (or distributed) to the client terminals 101, 102 from the server 103.

As shown in FIG. 9, the CPU 201 determines whether the self-extracting file (setup.exe) is activated (step S901). When determining that the file is activated, the CPU proceeds to step S902. Otherwise, the CPU stands by.

If it is determined in step S901 that the self-extracting file is activated, the CPU 201 acquires a start-up module at the topmost of the self-extracting file (setup.exe) 1906 (step S902), and executes the start-up module acquired in step S902 (step S903).

Next, the CPU 201 reads a header file 1909 of the setup.exe 1906, and acquires the size of the header file 1909, size of compressed printer driver installer (installer set), and path of execution module 1904 (step S904). Then, the CPU 201 clips a part of the setup.exe 1906 which is subsequent to a header of the header file 1909 and corresponds in compressed file size to the compressed printer driver installer (installer set) (step S905).

Next, the CPU 201 extracts the compressed printer driver installer (installer set) clipped in step S905 (step S906). The method for extraction may be an ordinary one, and a Windows (registered trademark) standard API, SetupiterateCabinet, can be used. Next, the CPU 201 activates the execution module by using the path acquired in step S904 (step S907). When the execution module is activated, the CPU 201 reads a definition file 1905 and acquires information necessary for installation (step S908).

Next, the CPU 201 activates a printer driver installer by using the printer driver installer path 2101 (FIG. 21) written in the definition file (step S909). In this example, the printer driver installer is present at the same location as the execution module. Alternatively, the printer driver installer path 2101 is represented by a network path. In that case, a printer driver installer on a network can be activated. Next, the printer driver installer activated in step S909 installs a printer driver based on the definition file (step S910).

As described above, heretofore, since a definition-file splitting method cannot be designated, laborious work is required to create a plurality of definition files, such as inputting a plurality of setting items for each definition file. On the other hand, according to the embodiment of this invention, the process for creating or re-creating definition files in batch, individually, or combinatorially is executed, thereby a plurality of definition files can be created by one operation. As a result, the operator is able to easily create definition files for use in installing drivers on respective ones of devices to be utilized, whereby the labor for the operation can be reduced.

Heretofore, in a case where there are a plurality of EXE files such as printer driver installers and execution modules, it is difficult for the administrator to find an EXE file to be executed to appropriately install the desired printer driver. With a self-extracting file, the administrator is not required to find the EXE file to be executed, and the desired printer driver can easily be installed.

With the installer set comprised of self-extracting file, the data capacity and the load of network can be reduced. This is noticeable in a case, for example, that the self-extracting file is distributed by using a distribution module.

It should be noted that the constructions and contents of various data described above are not limitative. Needless to say, these data are able to have various constructions and contents according to their applications and purposes. This invention can be embodied, e.g., in the form of a system. Specifically, this invention can be applied to a system comprised of a plurality of units and to an apparatus comprised of one unit.

The present invention can also be realized by executing the following process. That is, a process in which software (program) that realizes the functions of the above-described embodiment is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-259717, filed Oct. 6, 2008, which is hereby incorporated by reference herein in its entirety.

What is claimed is:

1. An information processing apparatus for managing a plurality of devices, comprising:
   a processor coupled to a memory and programmed to function as:
     a driver selection unit configured to accept a selection of device drivers;
     a setting information input unit configured to accept input of setting information related to the plurality of devices necessary for installing the selected device drivers;
     a device selection unit configured to accept a selection of devices;
     a definition file splitting method selection unit configured to accept a selection of one of a plurality of creation modes including a combinatorial and an individual creation mode, wherein each creation mode is configured to create one or more definition files including, as the setting information related to the selected devices, at least one of: device name information, IP address information, port information, protocol information, and location information; and
     an execution file creation unit configured to create, in accordance with the selected creation mode, at least one self-extracting execution file for installing the device drivers for the selected devices by using a device driver installer and the one or more definition files,
     wherein the combinatorial creation mode creates the one or more definition files based on a combination of a plurality of printers selected by a user via a detail setting screen by using printer information of each of the plurality of printers included in the combination.

2. An information processing apparatus for managing a plurality of devices, comprising:
   a processor coupled to a memory and programmed to function as:
     a driver selection unit configured to accept a selection of device drivers;
     a setting information input unit configured to accept input of setting information related to the plurality of devices necessary for installing the selected device drivers;
     a device selection unit configured to accept a selection of devices;
     a definition file splitting method selection unit configured to accept a selection of one of a plurality of creation modes including a batch and a combinatorial creation mode, wherein each creation mode is configured to create one or more definition files including as the setting information related to the selected devices, at least one of: device name information, IP address information, port information, protocol information, and location information; and
     an execution file creation unit configured to create, in accordance with the selected creation mode, at least one self-extracting execution file for installing the device drivers for the selected devices by using a device driver installer and the one or more definition files,
     wherein the combinatorial creation mode creates the one or more definition files based on a combination of a plurality of printers selected by a user via a detail setting screen by using printer information of each of the plurality of printers included in the combination.

3. The information processing apparatus according to claim 2, wherein, in a case where the batch creation mode is selected, the creation method selection unit creates the one or more definition files including a combination of pieces of setting information for all the selected devices and stores it in a folder associated with a folder name input by the setting information input unit.

4. The information processing apparatus according to claim 2, wherein, in a case where the individual creation mode is selected, the creation method selection unit creates the one or more definition files including pieces of setting information for respective ones of the selected devices and stores them in folders associated with folder names input by the setting information input unit.

5. The information processing apparatus according to claim 1, wherein, in a case where the combinatorial creation mode is selected, the creation method selection unit creates the one or more definition files, each including a combination of arbitrarily selected pieces of setting information, and stores them in folders associated with folder names input by the setting information input unit.

6. A method relating to setting of device drivers for a plurality of devices, comprising steps of:
   accepting a selection of device drivers;
   accepting input of setting information related to the plurality of devices necessary for installing the selected device drivers;
   accepting a selection of devices;
   accepting a definition file splitting method selection of one of a plurality of creation modes including a combinatorial and an individual creation mode, wherein each creation mode is configured to create one or more definition files including, as the setting information related to the selected devices, at least one of: device name information, IP address information, port information, protocol information, and location information; and
   creating, in accordance with the selected creation mode, at least one self-extracting execution file for installing the device drivers for the selected devices by using a device driver installer and the one or more definition files,
   wherein the combinatorial creation mode creates the one or more definition files based on a combination of a plurality of printers selected by a user via a detail setting screen by using printer information of each of the plurality of printers included in the combination.

7. A non-transitory computer-readable storage medium storing a program that when executed causes a computer to perform a method of setting of device drivers corresponding to a plurality of devices, the method comprising steps of:
   accepting a selection of device drivers;
   accepting input of setting information related to the plurality of devices necessary for installing the selected device drivers;
   accepting a selection of devices;
   accepting a definition file splitting method selection of one of a plurality of creation modes including a combinatorial and an individual creation mode, wherein each creation mode is configured to create one or more definition files including, as the setting information related to the selected devices, at least one of: device name information, IP address information, port information, protocol information, and location information; and
   creating, in accordance with the selected creation mode, at least one self-extracting execution file for installing the device drivers for the selected devices by using a device driver installer and the one or more definition files created in accordance with the selected creation method,
wherein the combinatorial creation mode creates the one or more definition files based on a combination of a plurality of printers selected by a user via a detail setting screen by using printer information of each of the plurality of printers included in the combination.

* * * * *